(12) United States Patent
Kikuchi

(10) Patent No.: US 7,450,288 B2
(45) Date of Patent: Nov. 11, 2008

(54) OPTICAL MODULATION DEVICE, OPTICAL TRANSMITTER, AND OPTICAL TRANSMISSION EQUIPMENT

(75) Inventor: Nobuhiko Kikuchi, Tokyo (JP)

(73) Assignee: Hitachi Communication Technologies, Ltd., Tokyo (JP)

( * ) Notice: Subject to any disclaimer, the term of this patent is extended or adjusted under 35 U.S.C. 154(b) by 63 days.

(21) Appl. No.: 11/562,068

(22) Filed: Nov. 21, 2006

(65) Prior Publication Data

US 2007/0146860 A1    Jun. 28, 2007

(30) Foreign Application Priority Data

Dec. 22, 2005    (JP) .............................. 2005-369010

(51) Int. Cl.
 *G02F 1/01* (2006.01)
 *G02F 1/00* (2006.01)
 *H04B 10/12* (2006.01)
(52) U.S. Cl. .................. 359/239; 359/276; 359/279; 359/322; 398/198
(58) Field of Classification Search .................. 359/237, 359/239, 276, 279, 322, 323; 398/195, 198
 See application file for complete search history.

(56) References Cited

U.S. PATENT DOCUMENTS

| | | | | |
|---|---|---|---|---|
| 5,003,624 A | * | 3/1991 | Terbrack et al. | 398/198 |
| 5,440,113 A | * | 8/1995 | Morin et al. | 250/205 |
| 5,488,503 A | * | 1/1996 | Schaffner et al. | 359/245 |
| 6,278,539 B1 | * | 8/2001 | Ooi et al. | 359/237 |
| 6,317,247 B1 | * | 11/2001 | Yang et al. | 359/245 |
| 6,362,913 B2 | * | 3/2002 | Ooi et al. | 359/245 |
| 7,200,343 B2 | * | 4/2007 | Ikeuchi | 398/198 |
| 2003/0185575 A1 | | 10/2003 | Ikeuchi | |

OTHER PUBLICATIONS

"40 Git/s L-band Transmission experiment using SPM-tolerant carrier-suppressed RZ format", by Hirano, et al, Electronics Letters Dec. 9, 1999, vol. 35, No. 25.
Journal of Lightwave Technology, vol. 15, No. 8, Aug. 1997. "Dispersion-Tolerant Optical Transmission System Using Duobinary Transmitter and Binary Receiver", pp. 1530-1537.

* cited by examiner

*Primary Examiner*—David N Spector
(74) *Attorney, Agent, or Firm*—Mattingly, Stanger, Malur & Brundidge, PC

(57) ABSTRACT

In the bias stabilization control using average optical power of signal light, there is a case where a control algorithm (maximum control or minimum control) changes depending on the amplitude of clock voltage, or it becomes out of control. In an optical modulation device for performing CSRZ optical modulation on outgoing light from an optical source, control light inputted from a control light input path is inputted into an LN-MZ optical modulator having traveling-wave type modulating electrodes from a direction opposite to signal light, and the average optical power is detected by a photodetector. A bias-voltage Vb is so generated that this optical power may be minimized, and is applied to a bias input terminal, whereby automatic bias stabilization control is performed.

15 Claims, 12 Drawing Sheets

FIG. 3A  Optical transmittance of MZ-modulator (DC extinction curve)
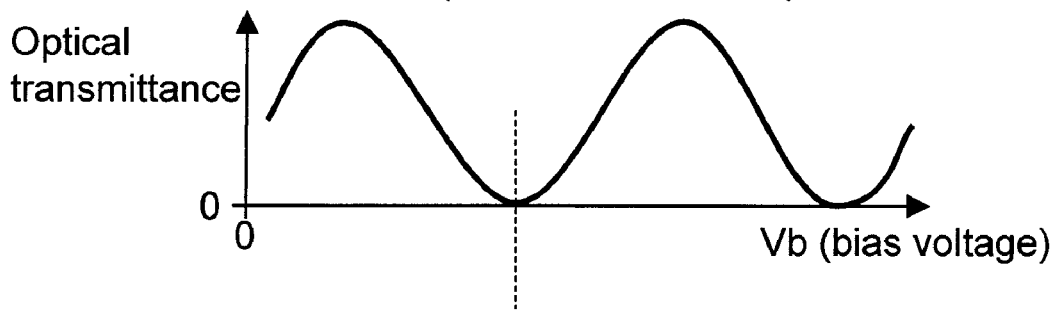
FIG. 3B  Average power of control signal (independent of clock amplitude)
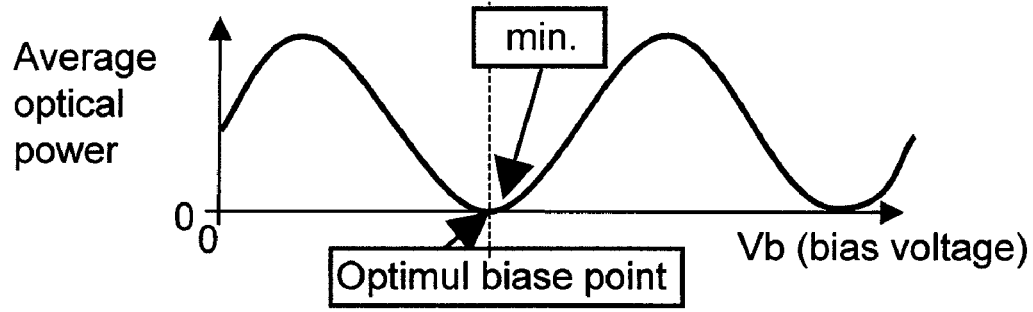
FIG. 3C  Algorithm fo minimizing control
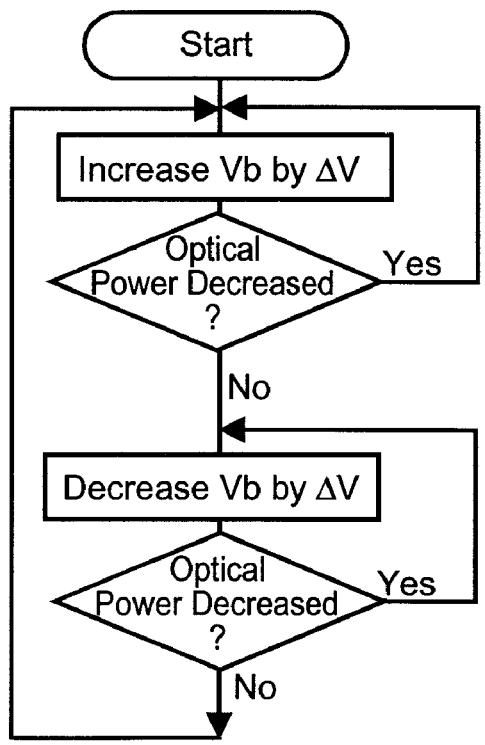

FIG. 6A  Optical transmittance of MZ-modulator (DC extinction curve)
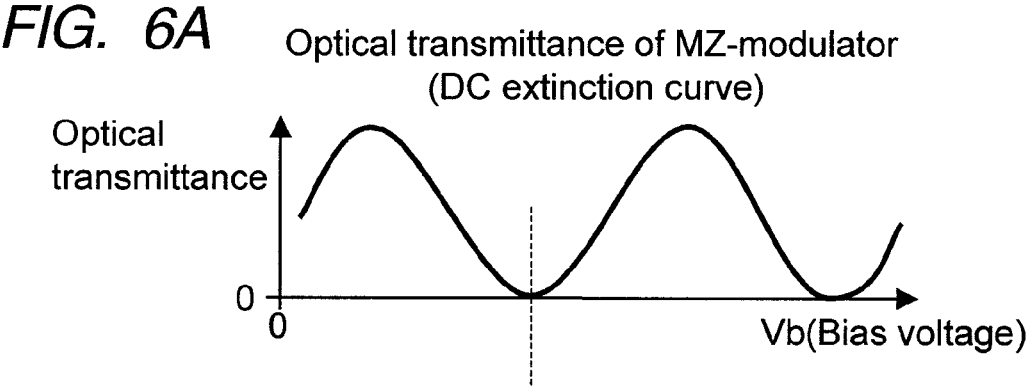
FIG. 6B  Average power of CSRZ optical signal (clock amplitude = $2V\pi$)
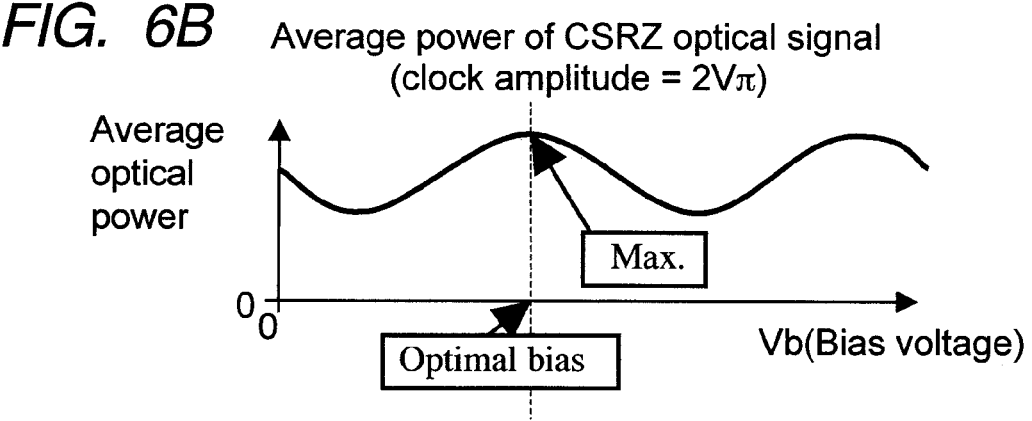
FIG. 6C  Average power of CSRZ optical signal (when clock amplitude is reduced)
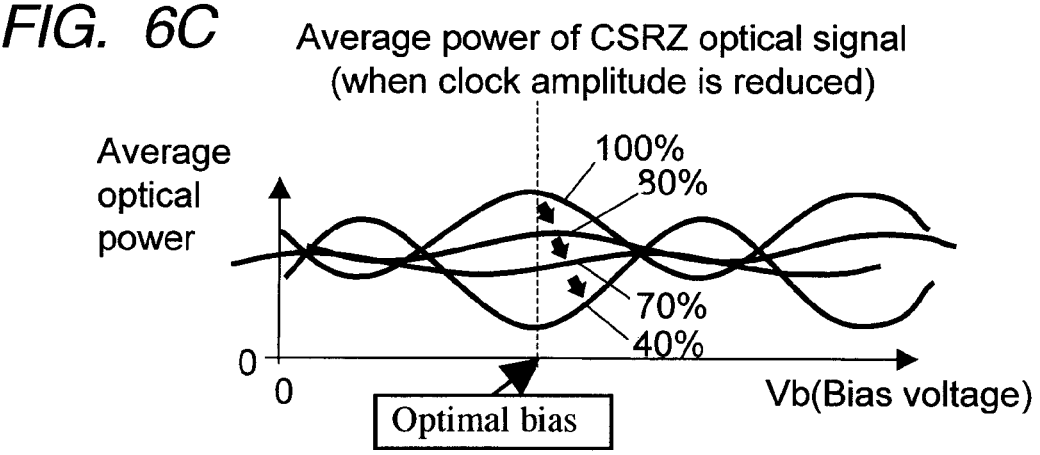

CRSZ pulse
(Vb=7.00V in (a))

CRSZ pulse
(Vb=7.75V in (a))

CRSZ pulse
(Vb=8.00V in (a))

OPTICAL MODULATION DEVICE, OPTICAL TRANSMITTER, AND OPTICAL TRANSMISSION EQUIPMENT

CLAIM OF PRIORITY

The present application claims priority from Japanese application JP 2005-369010 filed on Dec. 22, 2005, the content of which is hereby incorporated by reference into this application.

FIELD OF THE INVENTION

This invention relates to optical information transmission using optical fiber.

BACKGROUND OF THE INVENTION

Recently, the speed of high-speed large-capacity communication using optical fiber has reached 10-40 Gbit/s, and further increase and expansion of the transmission speed and the transmission range are approaching their limits. The major cause of this "wavelength dispersion" (CD: Chromatic Dispersion) and "optical fiber non-linear effects." Wavelength dispersion is a phenomenon in which lights of different wavelengths are transmitted at different speeds in optical fiber. The optical spectrum of an optical signal modulated at a high speed contains different wavelength components, and each wavelength component reaches a receiving end at a different time by the wavelength dispersion of the optical fiber used as a transmission line. Consequently, it is known that a light waveform after transmission suffers a large waveform distortion. Moreover, an optical fiber non-linear effect is a phenomenon in which while traveling in optical fiber, an optical signal induces extra phase modulation (frequency chirp) on itself or an optical signal advancing side by side by an intensity modulation component that the optical signal itself has. Still larger waveform distortion occurs by mutual interaction between this phase-modulated component and the above-mentioned wavelength dispersion.

Heretofore, in transmitting digital information by optical communication, there is widely used binary NRZ (Non-Return-to-Zero) modulation in which an electric digital signal as high as 2.5-40 GHz/s is inputted into an optical modulator or optical source, and an optical signal is turned on/off directly by it. However, since the NRZ signal is susceptible to the wavelength dispersion and the non-linear effect, various new modulation schemes are being studied for the purpose of reducing these influences in order to increase a transmission speed and to prolong a transmission range. As such modulation schemes, for example, A. Hirano, Y. Miyamoto, K. Yonenaga, A. Sano and H. Toba, "40 Gbit/s L-band transmission experiment using SPM-tolerant carrier-suppressed RZ format," IEE ELECTRONICS LETTERS, 9 Dec. 1999, Vol. 35, No. 25 discloses the CSRZ (Carrier-Suppressed Return-to-Zero) modulation and K. Yonenaga and S. Kuwano, "Dispersion-Tolerant Optical Transmission Using Duobinary Transmitter and Binary Receiver," JOURNAL OF LIGHTWAVE TECHNOLOGY, Vol. 15, No. 8, AUGUST 1997, pp. 1530-1537 discloses the optical duobinary modulation. The former is a modulation scheme in which an optical signal is converted into a pulse and modulated so that adjacent pulses may have optical phases of zero or π alternately, whereby tolerance against the non-linear effect that poses a problem in long distance transmission is increased. The latter is a light modulation scheme that improves wavelength dispersion tolerance largely by changing optical phase by 180° when the power of an optical signal changes as a mark, a space, and a mark.

In modulation of an optical signal like these, the need for strictly controlling an optical waveform and an optical phase modulation quantity arises, and stabilization control of the bias-voltage of the optical modulator becomes extremely important. As a conventional example, for example, JP-A No. 2003-283432 discloses this control. FIG. 4 is a block diagram of a CSRZ optical transmitter using conventional stabilization control of the bias-voltage like this. In this example, signal light outputted from a laser optical source 101 proceeding along a path 112 is first converted to a CSRZ pulse of 20 GHz by a conventional optical modulation device 114, then subjected to intensity modulation by a 20-Gbit/s NRZ data signal that is an electrical signal inputted from a data signal input terminal 124, and outputted as a 20-Gbit/s CSRZ optical waveform. As an optical modulator 102, it is common to use the Mach-Zehnder (MZ) type optical modulator based on a waveguide substrate of a material, such as Lithium Niobate (LN). A light input path 103 and a light output path 104 are provided in front of and behind the optical modulator 102. The optical modulator 102 is of a dual-drive type such that mutually phase reversed 10-GHz clock signals are impressed on two traveling wave electrode input terminals 107-1, 107-2, respectively. In the middle of the traveling wave electrode input terminal 107-2, a bias control signal input terminal 111 that allows a low-speed (direct current to about a few MHz at the highest) bias-voltage Vb to be applied through a bias tee 110. The bias-voltage Vb is used in order to set up an operating point of the optical modulator as will be described later.

FIG. 5 shows a principle of generating the CSRZ optical pulse with the dual-drive MZ type optical modulator. FIG. 5B is optical transmission characteristics of the dual-drive MZ modulator with a vertical axis representing optical transmittance and a horizontal axis representing a difference voltage applied to the two electrodes. The two parameters hold a sinusoidal relationship. A voltage width corresponding to a single period thereof is denoted as $V_{2\pi}$. To generate the CSRZ optical pulse, sinusoidal-waveform clock voltages (frequency: 10 GHz) whose phases are mutually reversed are applied to the two electrodes. A difference voltage across the two electrodes also becomes a sinusoidal wave, as shown in the figure. Hereinafter the voltage amplitude will be called simply "clock amplitude." The difference voltage is set up so that this clock amplitude may be about $V_{2\pi}$ and the bias-voltage Vb that centers in it may coincide with a bottom of the sinusoidal wave (optimal point) where the optical transmittance is minimized. When the bias-voltage coincides with the optimal point, the transmittance of the MZ modulator repeats on and off at a period of 20 GHz that is twice the frequency of the applied clock voltage, outputting a CSRZ optical pulse as in FIG. 5D from the light output path 104 of FIG. 4. However, it is known that because of manufacture variation, temperature, secular change, etc., the LN-MZ modulator like this inevitably leads to a variation in the voltage of the optimal point and exhibits temporal drift. When the bias-voltage shifts from the optimal point, the heights of the adjacent pulses become unequal, as in FIG. 5C, and accordingly large waveform distortion and degradation in the transmission characteristics (receiver sensitivity and transmission range) occur, which makes information transmission impossible. Because of this, it is necessary to perform automatic control so that the bias-voltage may always coincide with the optimal point.

Hereafter, the conventional automatic control of the bias-voltage will be explained. For this, the clock amplitude is made equal to $V_{2\pi}$ of the MZ modulator in FIG. 4. A part of the CSRZ optical pulse is led to a low-speed photodetector 108 with the use of an optical coupler 106, temporally averaged optical power (average optical power) is measured, and the information is outputted from an optical power signal output terminal 109. A few Hz to a few MHz at the highest are enough as a band of a photodetector required for measurement of the average optical power. FIGS. 6A, 6B, and 6C are diagrams showing a relationship between the average optical power of the CSRZ optical signal and the bias-voltage in the conventional CSRZ optical modulator. FIG. 6A shows the optical transmittance to a direct current voltage of the MZ modulator (extinction curve); FIG. 6B shows the average optical output power obtained from the low-speed photodetector 108. With a change of the bias-voltage Vb, the average optical output varies in the shape of a sinusoidal wave, and is maximized exactly when the bias-voltage coincides with a bias-voltage that minimizes the optical transmittance of FIG. 6A (optimal point of a dotted line). This is because when the clock amplitude is $V_{2\pi}$, if the bias-voltage is set to the optimal point, the maximum and the minimum of the clock voltage exactly coincide with a maximum point of the optical transmittance of FIG. 6A, and because when the bias-voltage shifts from this point to either a larger or smaller side, a wave height of the output waveform of one side decreases and the optical power reduces. Therefore, if the maximization control for controlling the bias-voltage Vb applied to the bias control signal input terminal is so performed that the average optical power obtained from the optical power signal output terminal 109 may always be maximized, an excellent optical CSRZ pulse is always obtainable.

JP-A No. 2003-283432 describes that the above-mentioned maximization control is applicable when the amplitude of the clock signal is equal to or more than 80% of $V_{2\pi}$ (=1.6 times $V_\pi$). FIG. 6C shows the average power of the CSRZ optical pulse when the clock amplitude is reduced to be lower than $V_{2\pi}$. As the clock amplitude becomes smaller, the amplitude of the average power becomes smaller. At an amplitude of about 70% of $V_{2\pi}$, its phase is reversed, and conversely, when the clock amplitude becomes about 40% of $V_{2\pi}$, the average optical power is minimized at the optimal bias-voltage. Because of this, JP-A No. 2003-283432 describes an example where, when the clock amplitude becomes small, minimization control is applied.

SUMMARY OF THE INVENTION

In the conventional example described above, by applying the maximization control when the clock amplitude is almost equal to $V_{2\pi}$ and by applying the minimization control when the clock amplitude decreases to about 60% or less, bias stabilization can be realized, but the following problems accompanies this.

Firstly, there is a problem that a range exists to which stabilization control cannot be applied depending on the clock amplitude. In the commonly used LN-MZ modulator, $V_{2\pi}$ is as extremely high a voltage as about 10 V (in the dual-drive scheme, 5 V or more for one side). In a frequency band exceeding 10 GHz that is normally used for optical communications, IC's and driver amplifiers capable of outputting such a high voltage will be expensive and difficult to obtain. Therefore, from a viewpoint of cost reduction and part procurement, it is desirable to reduce the clock amplitude as much as possible. However, in the range of the clock amplitude of 80% to 60%, automatic control cannot be applied in the conventional scheme. Even being out of this range, in the case of near this range (for example, a range of 90 to 50%), since the average optical power characteristic of FIG. 6C is almost flat, there is a problem that, even if the bias-voltage changes, a change in the average optical power is small; therefore, actually control precession becomes extremely poor, and it is not suitable to practical use. Moreover, there is a problem that, when the clock amplitude is reduced to 40% or less, the degree of modulation degree falls and the optical output power from an optical transmitter decreases sharply. Consequently, in the conventional example, the clock amplitude applied to the MZ modulator cannot be set up freely, which obstructs cost reduction and part procurement.

Secondly, there is a problem that an allowable margin for parts are small, which makes it difficult to manufacture an optical transmitter. Regarding high-frequency signals over a few GHz, because of existence of a ripple characteristic of a gain of an amplifier (normally 1 dB=about 20%), dispersion in loss of high-frequency cables and connectors, dispersion in the high-frequency modulation characteristic of a MZ modulator itself, etc., it is very difficult to manage the voltage amplitude to be applied and $V_{2\pi}$ of a modulator with high precision. However, in the conventional example, if the two change relatively by as much as 15-20%, the automatic control will cease to operate. This gives rise to the need of extra control, such as selecting parts to be used in an individual optical modulator by actual measurement, maintaining the clock voltage amplitude by automatic control, and the like, which makes the optical modulation device expensive and complex.

Thirdly, there is a problem that the CSRZ waveform cannot be made variable, and the optical modulator cannot be made compatible with future part alteration. If the clock amplitude can be freely changed in the CSRZ modulator, it is possible to adjust the transmission characteristics properly in accordance with the characteristics of an optical fiber transmission line by changing its waveform and duty ratio (ratio of on and off times). In the conventional control method, once the clock amplitude and the control method (maximization control or minimization control) are set up, a variable range of the clock amplitude is narrow, and a variable margin will become almost lost. With the same reason, once a design of the optical transmitter is completed, the design cannot respond to the case where a cheaper optical part becomes available later or a specification ($V_{2\pi}$ of the MZ modulator etc.) of an adopted part is altered, and a re-design becomes necessary. Consequently, an extra design time and cost are required.

As a conventional example free from such a problem, JP-A No. 2004-294883 discloses a bias-voltage controlling method that receives a created CS-RZ signal with a high-speed photodetector having a comparative band width to convert it to a high-speed electrical signal, extracts a specific frequency component with a filter so that its frequency spectrum may assume a desired form, and controls the bias-voltage so as to be maximized. However, there is a problem that a desired band of the photodetector like this reaches as high as 40 GHz in the case of a CSRZ pulse of 40 GHz, and it becomes very expensive as compared with a low-speed photodetector of about 1 MHz at the highest. Moreover, if a high-frequency filter (in the case of 40 Gbit/s, centered to 40 GHz) compatible with a specific spectrum component is used, the optical transmitter can operate only at a specific bit rate, and therefore there is a problem that the optical transmitter will become unable to respond with a change in bit rate (for example, 43 Gbit/s) when using an error correcting code etc.

The above-mentioned problems remain the same in the case where the optical modulator is other than the LN-MZ modulator, for example, a semiconductor type MZ modulator. Although it is said that the long-term stability of the semiconductor type MZ modulator is high as compared with the LN-MZ modulator, variation of the high frequency characteristic and temperature dependency of each modulator are rather larger than the LN-MZ modulator, and accordingly the same bias stabilization is necessary therefor. This situation is the same also in MZ modulators that use polymers etc.

Moreover, when the duobinary modulation that is a modulation scheme different from the above and the BPSK modulation that is the binary phase modulation are realized with MZ modulators, a point minimizing the transmittance is an optimal bias-voltage, as in the case of the CSRZ modulation described above, and consequently there is the same problem. The widely used NRZ modulation and RZ modulation also need bias stabilization control. However, there is a problem that, when a plurality of modulators are connected in a multistage configuration, discrimination of the control signals of the modulators became difficult or a change in the waveform of the optical signal, such as a duty ratio of the waveform, shifts an operating point or the like.

The object of this invention is to solve the above-mentioned problem and provide a control circuit of a bias-voltage of an optical modulator that is cheep, applicable to wide range of applications, and resistant to a variation in the optical modulation waveform.

The above-mentioned problem can be achieved by a configuration in which control light is transmitted in the interior of an optical modulator equipped with a travailing-wave modulation electrode in a direction opposite to the light to be modulated, the power of this control light is detected by a photodetector, and average optical power information of this control light is used for bias stabilization control of the optical modulator.

Especially, the control light is obtainable by making a part of signal light be reflected by a reflecting mirror or by equipping the optical modulator with a control optical source.

When the control light enters the optical modulator, its state of polarization becomes a problem. This problem can be solved by depolarizing the control light. This condition is realizable by equipping the input path of the control light with a polarization maintaining mechanism or a polarization adjusting mechanism, or by using an unpolarized optical source for the control optical source, or by depolarizing the control light by polarization scrambling.

The control circuit for the above-mentioned stabilization control can be provided in the interior of an optical modulation device, an optical transmitter, or the like. The control circuit is usable as long as the following is satisfied. The control circuit is a minimization control circuit or maximization control circuit for varying the output signal so that the input signal may be maximized or minimized, or an automatic control circuit that performs dithering of frequency f on the bias control signal and performs control so that the power of a component of frequency f or a component of frequency $2f$ in the input signal to the automatic control circuit may be zero or may be minimized or maximized, or so that a phase of a component of frequency f or frequency $2f$ in the input signal become a constant; or the like.

The effect of this invention is exerted by using any one of the following as the above-mentioned traveling-wave type optical modulator: a traveling-wave type Mach-Zehnder modulator, a traveling-wave type semiconductor absorptive optical modulator, a traveling-wave type optical phase modulator, a traveling-wave type optical power modulator, and a traveling-wave type optical power and phase modulator. Moreover, if the modulation scheme is the carrier suppression RZ (CSRZ) modulation, or the binary optical phase modulation, or the optical duobinary modulation, the effect of this invention is especially large.

What is necessary to perform the control of this invention stably is just to observe an output signal of the photodetector, or the power of the control light inputted into the optical modulator, or the power of the control light fed to an output port of the optical modulator, and to stop the control operation when any of these powers decreases to a constant or less or start the control operation immediately after it increases to a constant or higher or after lapse of a fixed time.

Even if optical modulation devices are connected in parallel or in cascade, by feeding the control light to an output port of the most downstream optical modulator and making the photodetector of the respective optical modulation devices detect respective output light, the invention can be applied to the optical modulation device.

What is necessary to apply this invention to the optical transmitter is either realizing a configuration of connecting a signal optical source for outputting modulated or nonmodulated laser light in cascade, or realizing a configuration of arranging the signal optical source for outputting modulated or nonmodulated laser light and an optical modulation device of this invention in cascade or in parallel. In this occasion, by providing an information path that measures the optical power information outputted from the photodetector or the optical power information of the control light inputted into the optical modulator and outputs it to the outside or providing an information path into which start or stop of an operation of the control circuit is inputted, it becomes possible to grasp a state of the optical modulation device from the outside and at the same time control an operation of the optical modulation device.

Furthermore, if the optical modulation device is configured to allow the above-mentioned information to be inputted and outputted from/to the each optical transmission equipment or remote control console, there is the effect of capability of automatically or remotely monitoring a state of this optical modulator and controlling its operation.

This invention has an effect that solves the three problems described above in the optical modulation device, which is typified by the CSRZ modulation device, and enables the stabilization control of the bias-voltage using the same control algorithm and circuit (for example, minimization control circuit) regardless the clock amplitude. As a result, it becomes possible to realize an optical transmitter even in a range where the clock amplitude is 60-80% of $V_{2\pi}$ of the optical modulator to which the conventional control method cannot be applied. Moreover, this invention provides several effects: An allowable range of characteristic variation of the modulator and high-frequency parts and specification alteration is widened, procurement costs of parts are reduced, procurement of parts is made easier, design alteration in the future is facilitated, etc. Furthermore, since the clock amplitude can be made variable in a wider range, this invention provides an advantage of realizing an optical transmitter capable of changing its waveform and duty ratio.

In addition, since by performing the bias control that uses the control light being transmitted through an optical modulator in an opposite direction, the control light is hardly modulated with a high-frequency signal in this invention, the invention provides an effect that the bias point becomes resistant to a change of the modulation scheme of a modulated waveform and a variation in the waveform, such as the duty ratio of the waveform. Consequently, the control scheme and circuit of this invention can be used commonly in a plurality of optical transmitters each of a different bit rate or a different optical modulation scheme, having effects of cost reduction and achievement of common use. In addition, it has an effect that a transmission waveform can be easily varied even with a single optical transmitter.

Moreover, since the signal light was conventionally used for bias control of each optical modulator as it was, there was a problem that separation of the control signal became difficult when a plurality of optical modulators were cascaded in a multistage configuration. Since this invention uses the reverse traveling control light, it becomes possible to extract the control light in each stage and use the control lights whose wavelength is different from other control light, and the control scheme and circuit become able to be used coexisting with the conventional control method, thereby bringing an advantage that separation of the control signals becomes easy.

Moreover, the configuration of this invention using reflected light comes with an effect of negating the need of the control optical source. By using a polarization-maintaining fiber or polarization scrambler for connection of reflecting mirrors, and by using a partial reflection mirror disposed in a signal light path as a reflecting mirror, this configuration exerts an effect of becoming less prone to fluctuation in the state of polarization caused by bending of optical fiber.

On the other hand, in the case of using the control optical source emitting light different from the signal light, there is an effect of preventing an influence of noises due to a loss of the signal light and an influence of interference of stray light. Furthermore, the use of a polarization independent optical source or polarization scrambling configuration creates an effect of being not influenced by fluctuation in the state of polarization caused by bending of optical fiber serving as a signal path.

BRIEF DESCRIPTION OF THE DRAWINGS

FIGS. 3A, 3B, and 3C are diagrams showing a principle of bias stabilization control in the first embodiment of this invention;

FIG. 3A is a diagram of optical transmittance of a MZ modulator;

FIG. 3B is a diagram of average power of a control signal;

FIG. 3C is a diagram of an algorithm for minimizing control;

FIGS. 6A, 6B, 6C are diagrams showing a relationship between the average optical power of a CSRZ optical signal and the bias-voltage in the conventional CSRZ optical modulator;

FIG. 6A is a diagram of optical transmittance of a MZ modulator;

FIG. 6B is a diagram of average power of a CSRZ optical signal;

FIG. 6C is a diagram of average power of a CSRZ optical signal;

FIG. 7A is a block diagram of the second embodiment of Type-1;

FIG. 7B is a block diagram of the second embodiment of Type-2;

FIG. 8A is a diagram of average optical power as a function of bias voltage;

FIG. 8B is a diagram of a waveform of a CSRZ pulse;

FIG. 8C is a diagram of a waveform of a CSRZ pulse;

FIG. 8D is a diagram of a waveform of a CSRZ pulse;

FIG. 8E is a diagram of average optical power as a function of bias voltage;

DETAILED DESCRIPTION OF THE PREFERRED EMBODIMENTS

Figure 1:
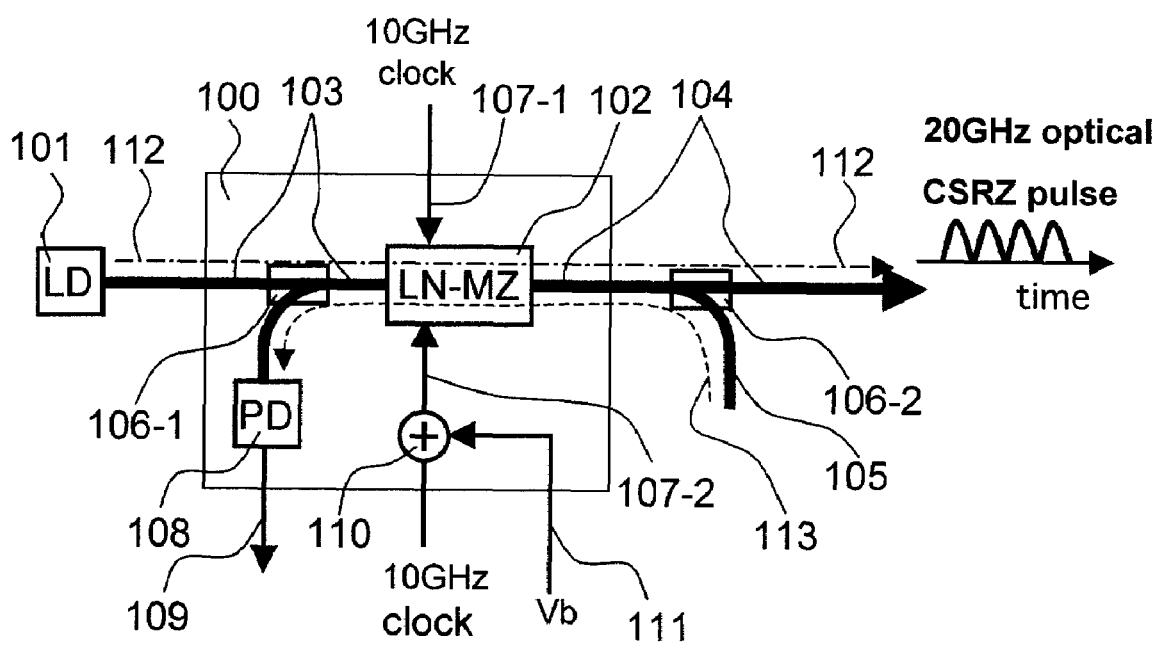
FIG. 1 is a block diagram showing a first embodiment of this invention.

A best form that carries out this invention is a form of FIG. 1 shown in a first embodiment below. In this embodiment, a laser beam outputted from a laser optical source 101 is inputted into an optical modulator 102 from a light input path 103-1, and is outputted as a CSRZ optical pulse from a light output path 104. Sinusoidal clock signals of a frequency of 10 GHz whose phases are mutually reversed are applied to the two traveling wave electrode input terminals 107-1, 107-2 of the optical modulator 102. An optical coupler 106-1 is provided in the middle of the light input path 103; an optical coupler 106-2 is provided in the middle of the light output path 104. A path that is branched by the optical coupler 106-2 is used as a control light input path, from which control light is inputted in a direction opposite to signal light in an optical path 112. The inputted control light is transmitted through the optical modulator 102 in an opposite direction along the control light path 113. A part of it is split by the optical coupler and led to the low-speed photodetector 108 disposed on the further side of the optical coupler 106-1 and an average optical power is measured thereby. What is necessary is just to control a bias-voltage Vb automatically so that this average optical power may be minimized.

First Embodiment

FIG. 1 is a block diagram showing a first embodiment of this invention, which is an example where an optical modulation device 100 of this invention is applied for formation of the CSRZ optical pulse. The laser beam outputted from the laser optical source 101 advances along the path 112 of the signal light in the figure, is inputted into the optical modulator 102 from the light input path 103-1, and outputted as the CSRZ optical pulse from the light output path 104. As the optical modulator 102, a general dual-drive LN-MZ modulator is used, and the sinusoidal wave clock signals of a frequency of 10 GHz whose phases are mutually reversed are applied to the two traveling-wave type input terminals 107-1, 107-2. A generation principle of the CSRZ optical pulse is the same as that of the conventional example described above. A low-speed (direct current or about a few MHz at the highest) bias-voltage Vb is connected to the traveling-wave type input terminal 107-2 through a bias tee 110.

In this example, the optical coupler 106-1 and an optical coupler 106-2 are provided in the middle of the light input path 103 and in the middle of the light output path 104, respectively. The control light is inputted from a control light input path 105 branched by the optical coupler 106-2 in a direction opposite to the signal light in the path 112. The inputted control light is transmitted through the optical modulator 102 along a control light path 113 in an opposite direction. A part of it is split by the optical coupler 106-1 and led to the low-speed photodetector 108 disposed on the further side of the optical coupler 106-1. The measured average power of the control light is outputted from the optical power signal output terminal 109 to the outside.

Figure 2:
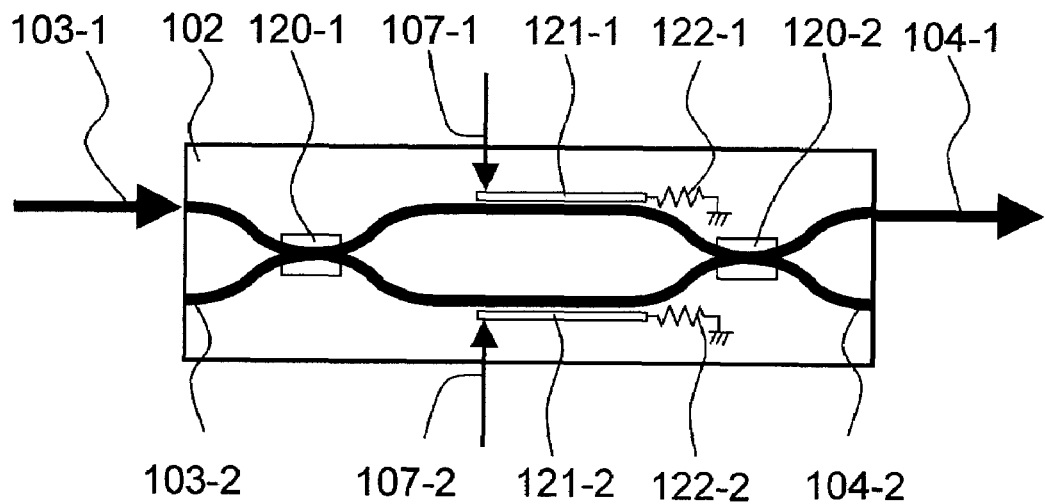
FIG. 2 is a block diagram of an optical modulator 102 in the first embodiment of this invention.
Figure 4:
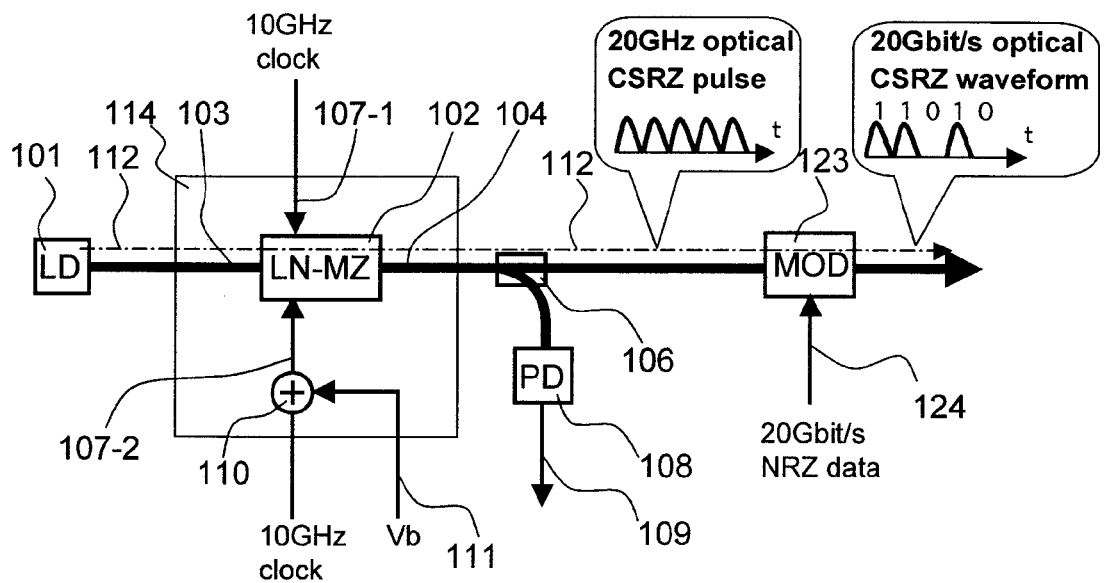
FIG. 4 is a block diagram of a CSRZ optical transmitter using the conventional stabilization control of bias-voltage.
Figure 5:
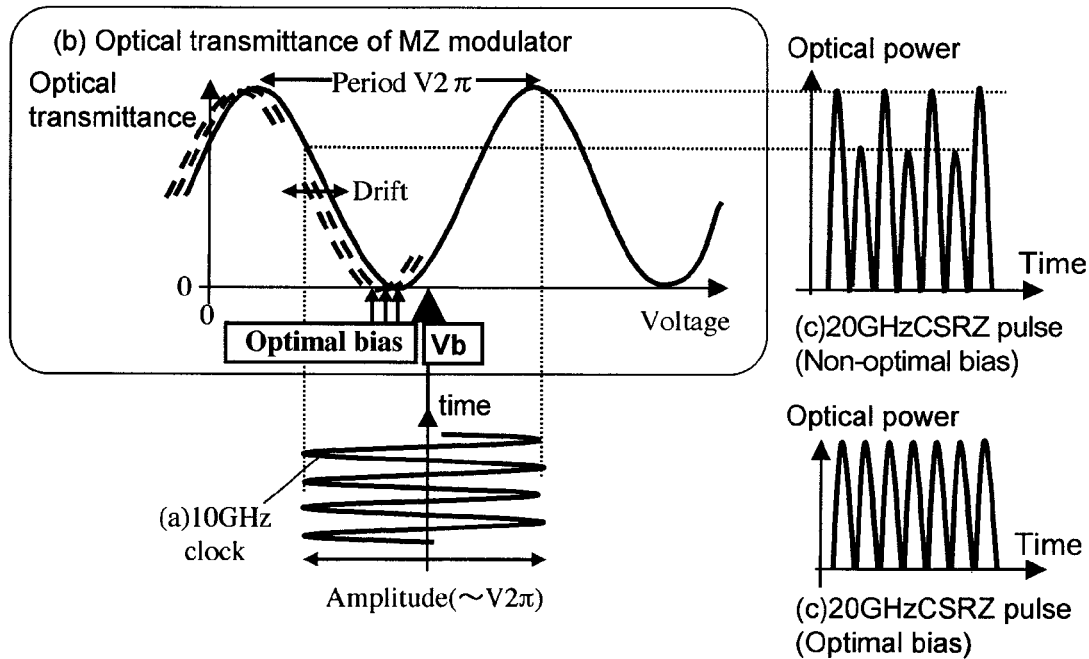
FIG. 5 is a diagram showing a principle of generating the CSRZ optical pulse using a dual-drive MZ optical modulator.

FIG. 2 is a block diagram of the optical modulator 102 in the first embodiment of this invention, showing an internal structure example of the dual-drive LN-MZ modulator with traveling wave electrodes. The LN-MZ optical modulator is constructed with a waveguide (optical path) formed on a thin-film substrate of LN-crystal having an electro-optic effect by using a Ti (titanium) diffusion technology etc. Generally the MZ modulator is a combination of a 2×2 optical coupler 120-1 with two inputs and two output and a 2×2 optical coupler 120-2 with the two light output paths of the former being connected to the two light input paths of the latter, respectively, and equipped with traveling-wave type electrodes 121-1, 121-2 arranged adjacent to these paths. Since the remaining input terminal of the coupler acts as a light input/output path, the MZ optical modulator is originally a multi-input and multi-output device having two light input paths (103-1, 103-2 of the figure) and two light output paths (104-1, 104-2). Normally, one light input path 103-1 among these paths and one light output path 104-1 are used as a light input and as a light output, respectively. As a whole, this modulator constitutes the Mach-Zehnder type light interferometer that splits light into two and combines the two after a phase difference is given to the two beams of split light. Optical transmission characteristics of this optical modulator can be altered by creating a phase difference in the interferometer whose electrodes are given a voltage difference. When the phase difference is zero, the transmittance is maximized; when the phase difference is $\pi$, the transmittance is minimized (nearly zero). In the optical modulator like this, if the frequency of the electrical signal applied to the electrodes is increased to a few GHz or more, modulation efficiency will fall largely due to parasitic capacitance of the electrodes and will stop its operation. For this purpose, first, termination registers of the electrodes are disposed in such a way as registers 122-1, 122-2 in the figure, and electrode impedance is adjusted, so that the whole electrodes are distributed-constant transmission line that are not influenced by the parasitic capacitance. Furthermore, by adopting traveling wave electrodes so designed that the speed of the electrical signals traveling in the electrodes accord with the speed of the optical signal traveling in the waveguide, the optical modulator becomes capable of an optical modulation operation even for high-speed signals of 10-40 GHz or more by preventing decrease in modulation efficiency.

Such an optical modulator has a characteristic that although it has non-zero optical transmittance also in an opposite direction and it is possible to output an optical signal from the light input paths 103-1, 103-2 by inputting the optical signal from either of the light output paths 104-1, 104-2, the effect of the traveling wave electrodes does not work on the reversing optical signal, and a modulation band will decrease to about 1 to a few GHz at the highest. That is, especially when applying a sinusoidal clock signal of a few to a few tens of GHz, such as a RZ waveform, a CSRZ waveform, and analog modulation, on the electrodes, the light traveling in an opposite direction is hardly modulated in high frequencies but a change in the bias-voltage in a direct-current manner determines the optical transmittance.

FIG. 3 shows this characteristic. FIGS. 3A and 3B are diagrams showing a principle of bias stabilization control of this invention. FIG. 3A is a bias-voltage dependency of the optical transmittance of the MZ modulator (direct current extinction curve). As described above, since the control light is not subjected to high-frequency modulation, the optical transmittance shown in FIG. 3B is governed only by the bias-voltage Vb uniquely, and its characteristic coincides with the direct current extinction curve of FIG. 3A. Therefore, by minimization control of applying the bias-voltage Vb so that the power of the control light is always minimized, it becomes possible to perform stabilization control of putting the bias-voltage Vb always at a minimum point of the extinction curve.

FIG. 3C shows an example of the algorithm of the above-mentioned minimization control. First, only the bias-voltage Vb is increased by a micro value $\Delta V$, and it is observed how the optical power information obtained from the optical power signal output terminal 109 changes. If the optical power decreases, the bias-voltage Vb continues to be decreased; if the optical power increases, the bias-voltage Vb is increased by a micro value $\Delta V$ conversely. Repeating this procedure realizes the minimization control.

Note that the algorithm of the minimization control (or maximization control) is not limited to what is shown in this example, any algorithm is applicable as long as it is a common minimization (maximization) algorithm. That is, techniques of using the Newton method, the binary search method, a technique of controlling the bias-voltage so that a differential value of the optical power signal becomes zero, etc. are applicable. The control circuit may be an analog circuit, of a digital control, or of a computer-assisted control.

Here, in the case where an actual electrical signal source or optical device is used, if the minimization (maximization) control as in FIG. 3C is performed, there is the possibility that the bias-voltage Vb reaches a limit of a voltage range that can be outputted or exceeds an electrode withstand voltage of an optical device or IC. In such a case, conceivable measures are one that shifts the bias-voltage by one cycle ($V_{2\pi}$) in a short time and restarts a control operation, one that starts a control after selecting beforehand an optimal point at which the voltage range has a widest allowance, and the like.

Incidentally, in this embodiment, a term bias-voltage control is used for a voltage input type optical modulator as a target of this term, but this invention can be widely applied to an optical modulator for controlling a bias point based on a different physical quantity. For example, there is no problem if the optical modulator adopted is an optical modulator whose bias point is controlled by, for example, a temperature of its optical waveguide, a pressure, a current flowing in a heater, a current flowing in a semiconductor phase modulator, etc.

Note that although in this figure paths of the optical signals (light input path 103, light output path 104, etc.) are indicated with thick lines, these portions can be realized in various forms, such as optical fiber, optical waveguides on a glass substrate etc. and optical beams in a space.

Second Embodiment

Figure 7A:
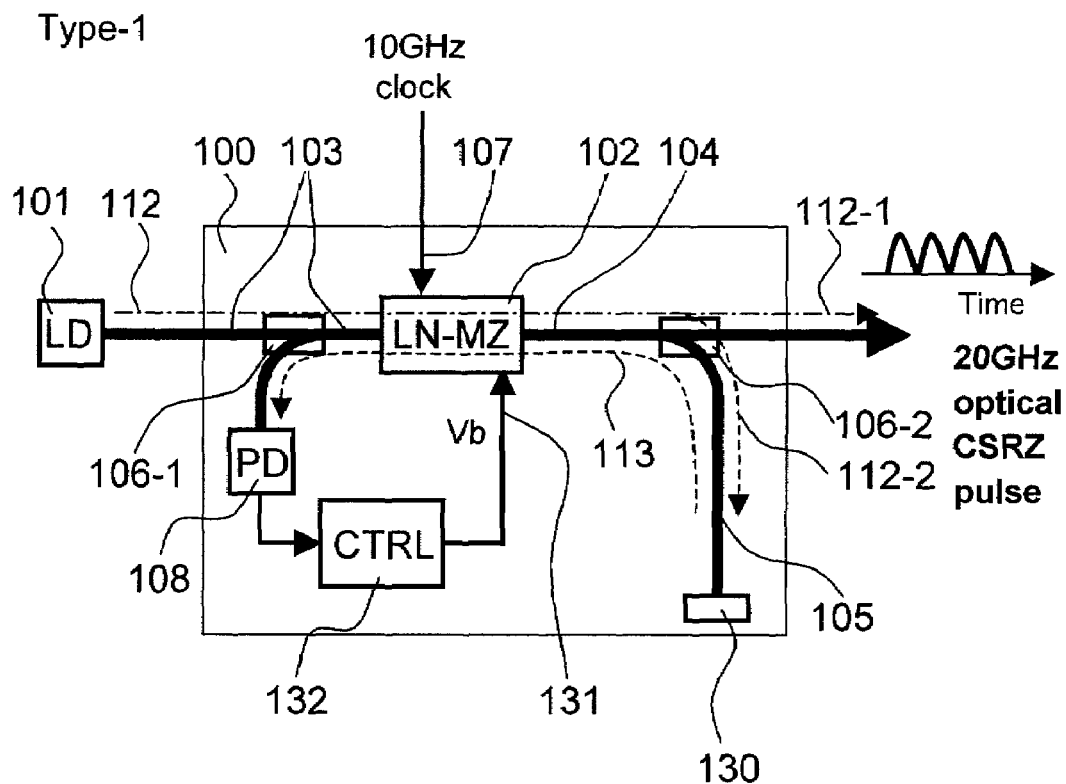
FIGS. 7A and 7B are block diagrams showing a second embodiment of this invention.

FIG. 7 is a block diagram showing a second embodiment of this invention, which is an example where a part of the signal light is reflected by a reflecting mirror, this reflected light is used as the control light, and an automatic control circuit is disposed in the interior of the optical modulation device 100 of this invention. A reflecting mirror 130 is connected to the end of the control light input path 105 in FIG. 7A. By this, a part of the signal light (path 112-2) that is split to the control light input path 105 side by the optical coupler 106-2 is reflected, and transmitted in an opposite direction. Accordingly, this can be used as the control light. When the signal light is transmitted through the optical modulator 102 in a forward direction first, it is subjected to the CSRZ pulse modulation, and the average power at the optimal point will change with the clock amplitude, as shown in FIG. 6C. However, when this signal reverses the optical modulator 102 as the control light, modulation with such a characteristic that the optical power is minimized (nearly zero) at the optimal point is superimposed on it, as shown in FIG. 3B. As a result, a modulation characteristic of FIG. 3B that gives larger degree of modulation is exhibited finally, and the average optical power is always minimized at the optimal point. For this reason, by controlling the bias-voltage Vb with a minimization control circuit 132 so that the average optical power measured by the photodetector 108 may be always minimized and applying it to a bias control signal input terminal 131, bias stabilization control that does not depend on the clock width becomes possible.

In addition, although this example shows a configuration in which an X-cut (or Z-cut) LN-MZ modulator with a single pair of travailing-wave electrode input terminals 107 is used, a 10-GHz clock of a single system is added, and the bias-voltage Vb is applied to a bias control signal input terminal 131 exclusively provided; there is no essential difference in the application of this invention. As a bias-voltage application method, there is further a method for providing an adder circuit of bias-voltage in the interior of a drive circuit for generating a high-frequency electrical signal. Any technique can be applied without a problem as long as it is a method for varying a direct current level of the high-frequency signal.

In addition, in the case where the optical modulator 102 is the LN-MZ modulator etc., the modulator itself has polarization dependency, being capable of optical modulation on an optical signal of only a specific polarization. In such a case, by forming optical paths extending from the light output path 104 of the optical modulator 102 to the optical coupler 106-2 and to a reflecting mirror of the control light input path 105 as a structure in which a state of polarization does not change, such as polarization maintaining fiber, a spatial optics, and a waveguide substrate, it is made possible for the optical modulator 102 to always modulate the control light, giving a proper control signal. Moreover, in the case where these paths are connected with one another with normal optical fiber, such as single-mode optical fiber, a method in which a manual or automatic state-of-polarization controller is disposed in the middle of the control light input path 105, and a state of polarization of the control light is fixed so as to input into the optical modulator with an optimal state of polarization in conformity to an implementation state of optical fiber or an automatic control is performed so that the control light may be always with an optimal state of polarization is also applicable.

Figure 7B:
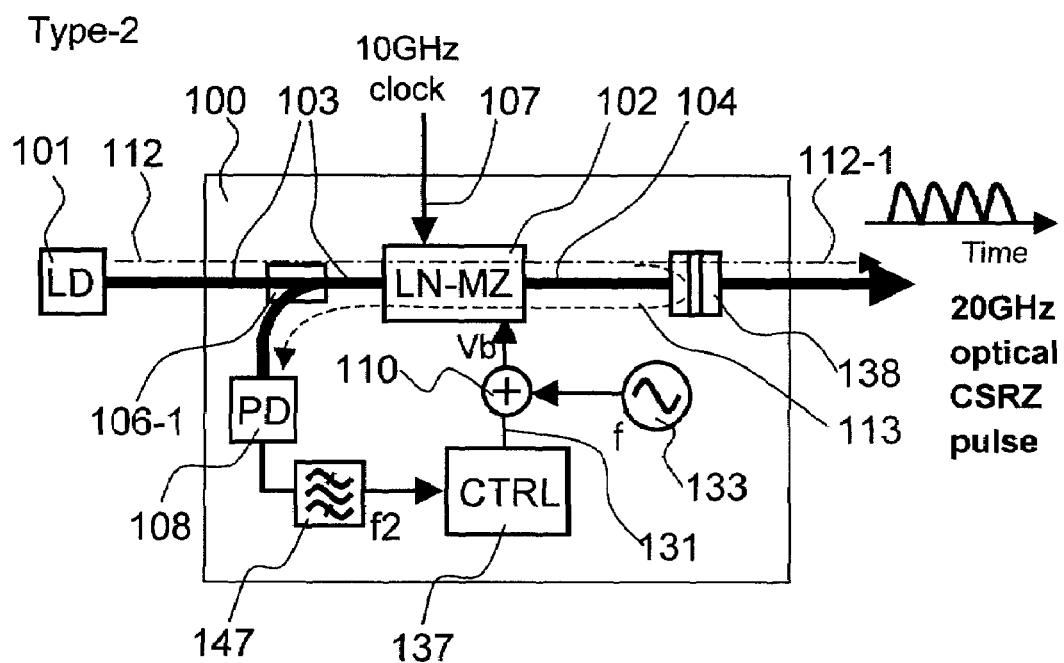

A form of FIG. 7B is a configuration of directly disposing a dielectrics multilayer film mirror 138 as a reflecting mirror in the middle of the light output path 104, and a part of the signal light is reflected and used as the control light without modification. As such reflecting mirrors, there are a dielectric multilayer film mirror and an optical fiber grating, each of which can be disposed directly in the middle of optical fiber and can set up the reflectance freely without changing a state of polarization of an optical signal. Because of these merits, this invention can be carried out with an inexpensive and simple configuration without the necessity of a polarization controller and polarization maintaining fiber.

Moreover, in this embodiment, a low-frequency sinusoidal-wave signal source is connected in the middle of the bias control signal input terminal 131 with a bias tee 110, which superimposes a signal of frequency f (for example a few kHz) with a micro amplitude on the bias-voltage Vb, and high-precession bias stabilization control is realized using this frequency component. In this example, the low-speed photodetector 108 detects the control light (reflected light), a bandpass filter 147 detects a component of frequency $2f$ from the obtained signal, and a maximization control circuit 137 automatically controls the bias-voltage Vb so that this component may be maximized. That is, since the optical power characteristic is convex to the upside and a second nonlinearity is large at the optimal point of FIG. 3B, if the bias-voltage Vb is on the optimal point, a micro sinusoidal modulation of frequency f is converted into a component of frequency $2f$ maximally. Then, a component of frequency $2f$ is extracted by the bandpass filter 147 and the control light is so controlled that this component may be maximized, whereby high-sensitivity bias stabilization control is made possible. As a further high-sensitivity control method, a control such that a phase of a component of frequency $2f$ may become constant is also possible.

FIG. 8 is a result of checking the effect of this invention in an actual experiment using the configuration of FIG. 7A. FIG. 8A shows a case where the clock amplitude is about 77% of $V_{2\pi}$. The "transmitted light power" in the figure is the average optical power of the CSRZ optical pulse outputted to an optical path 112-1 of FIG. 7A, and the "reflected light power" is the optical power detected by the low-speed photodetector 108. A manual state-of-polarization controller is disposed in the middle of the control light input path 105, and adjusts the state of polarization so that the reflected light may be properly modulated by the optical modulator 102. FIG. 8A indicates that even if the bias-voltage Vb (horizontal axis) changes, the average power of the transmitted light hardly changes and its amplitude is only within about 1 dB, whereas the power of the reflected light changes largely, having an amplitude of 15 dB at its maximum. The optimal point of the bias-voltage is Vb=7.75 V, and the CSRZ optical pulse outputted at this point becomes a most symmetric waveform as shown in FIG. 8C. The transmitted light power of the conventional example takes a maximum at this point, whereas the reflected light power of this invention takes a minimum at this point. As a contrast, FIGS. 8B and 8D are the CSRZ light waveforms when the bias-voltage is changed from the optimal point by 0.75 V and 0.25 V, respectively. Since the shift is large in the former case, a large waveform change can be seen, Even in the latter case, although the shift is as small as 0.25 V (corresponding to 2.3% to $V_{2\pi}$=10.67 V), it can be seen that a slight difference of height occurs between adjacent pulses. Therefore, in order to prevent degradation in the transmission characteristics, it is necessary to stabilize the bias-voltage with precision to 2% of $V_{2\pi}$ or more. On the other hand, in the case of the transmitted light power of the conventional example, a change in the average optical power with respect to a change in the bias-voltage of 0.75 V (6%) is only 0.05 dB (normally measurement of 0.1 dB or less is extremely difficult). In contrast to this, signal strength of 1 dB or more is generated to a change in the bias-voltage of 0.25 V in the reflected light power of this invention, much higher-precision control can be realized.

Figure 8A:
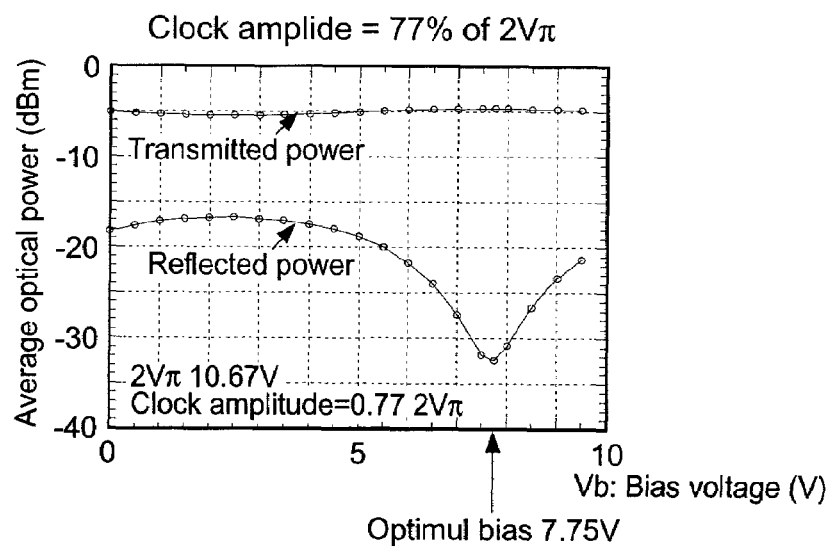
FIGS. 8A, 8B, 8C, 8D, and 8E are diagrams showing a comparison of the average optical power between a scheme of this invention and that of the conventional technique.
Figure 8B:
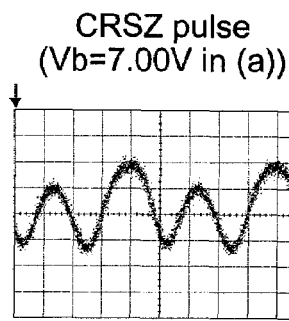
Figure 8C:
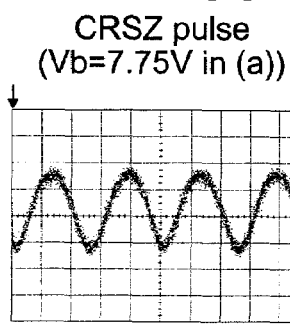
Figure 8D:
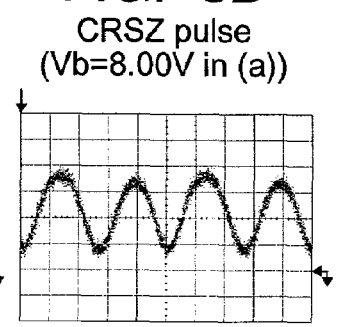
Figure 8E:
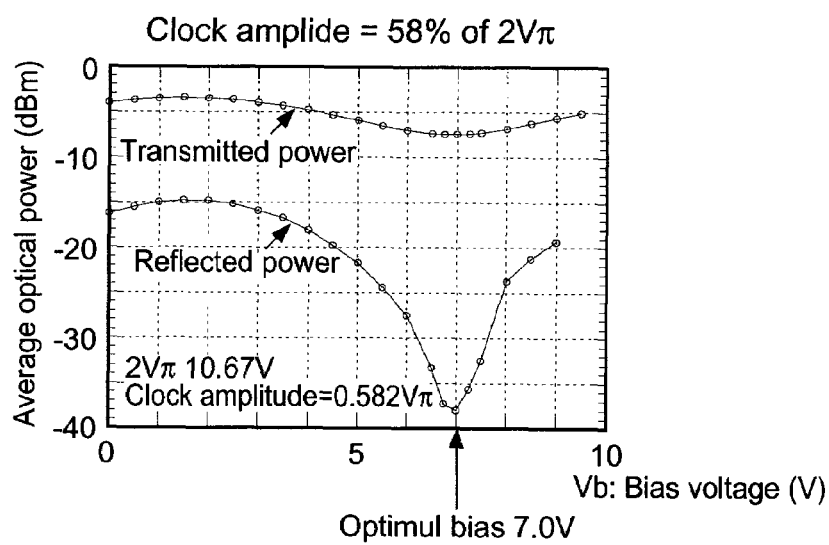

FIG. 8E shows an example where the clock voltage is reduced to 58% of $V_{2\pi}$. In this example, the optimal bias-voltage at which an excellent CSRZ waveform can be obtained is 7.0 V and it turns out that the power of the transmitted light is minimized at the optimal point, which is contrary to FIG. 8A. That is, the results show that it is necessary to switch between the minimization control and the maximization control depending on the clock amplitude, as described above. Contrary to this, in the case of the reflected light power of this invention, the characteristic that the optical power is minimized at the optimal point to a change in the bias-voltage, as in the case of FIG. 8A, is maintained. Consequently, it can be checked that what is necessary is to apply the minimization control always not depending on the clock amplitude. Moreover, a change width of the signal strength associated with a change in the bias is 4 dB in the case of the conventional transmission power, whereas it is 23 dB in the case of the reflected light power of this invention, which indicates that a large dynamic range required for high-precision control is secured. From the result, the effect of this invention can be verified.

Third Embodiment

Figure 9:
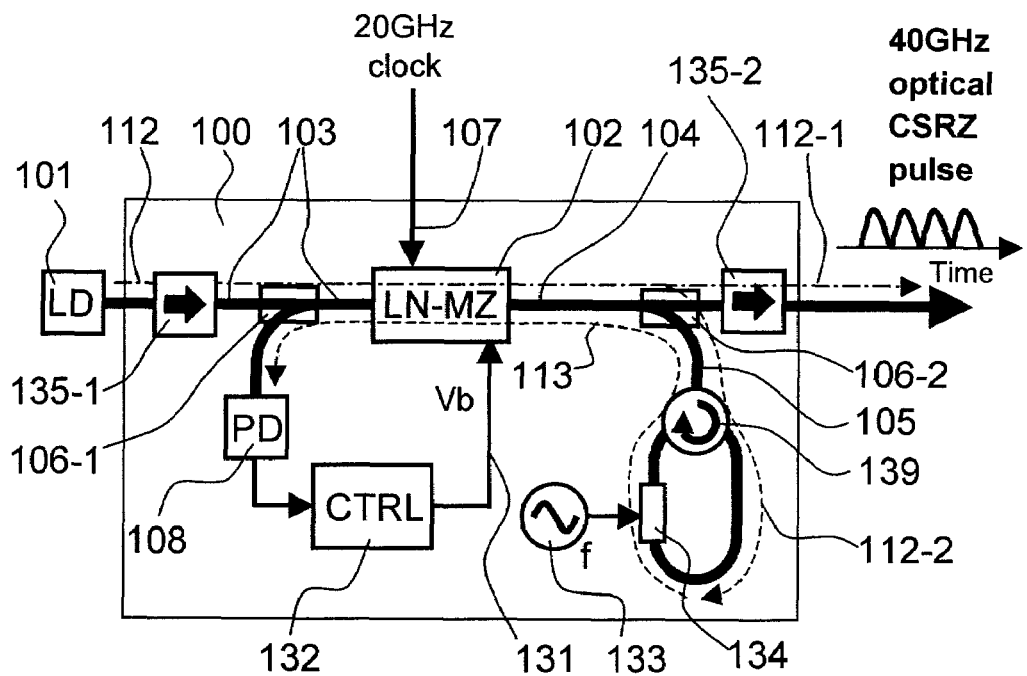
FIG. 9 is a block diagram showing a third embodiment of this invention.

FIG. 9 is a block diagram showing a third embodiment of this invention, which is an example where a state of polarization of the control light is temporally scrambled using an electric control polarization controller to resolve the polarization dependency. This example is an example of using a loop type mirror that, by connecting an optical circulator 139 to a top of the control light input path 105 and further connecting optical fiber to the loop further ahead of this, the CSRZ optical signal inputted therein along the optical path 112-2 is made to go one round, drawn back to the original path, and used as the control light. An electric control polarization controller 134 is disposed in a part of the loop. This is used as a polarization scrambler on which a sinusoidal electrical signal of frequency f (for example, a few kHz to a few tens of kHz) obtained from a low-frequency sinusoidal-wave signal source 133 is applied and that reduces the degree of polarization of the control light passing therethrough along the control light path 113 to about 0.5. Thus, if the degree of polarization of the control light is reduced, even in the case where the MZ modulator has polarization dependency or the polarizer is built in its interior, about 50% of the control light is modulated by the optical modulator 102, and the light reaches the low-speed photodetector 108. Since the component of frequency f in the control light will be time-averaged for an integration time of the low-speed photodetector 108 sufficiently longer than f, automatic control of the bias-voltage can be realized without being affected by fluctuation in the state of polarization of the optical fiber path.

In this example, optical isolators 135-1, 135-2 are disposed in the signal input part and the signal output part of the optical modulation device 100 of this invention. The optical isolator is a device for preventing reverse traveling of an optical signal. The former isolator 135-1 prevents the control light from leaking to the upstream of a light input path 103. This isolator can prevent the control light of the same wavelength as that of the signal light from entering an optical element in the upstream and prevent degradation in a signal that is caused by unexpected interference between the control light reflected by a connector etc. and the signal light. Moreover, the latter isolator 135-2 prevents external light from influencing the low-speed photodetector 108 etc. In case where an intense optical signal is injected from the outside or a part of the output light is reflected and travels reversely in the internal of the optical modulation device 100 by any chance, there is the possibility that the light is inputted into the low-speed photodetector 108 to cause the minimization control circuit 132 to operate erroneously. The optical isolator 135-2 is effective for preventing these phenomena.

Fourth Embodiment

Figure 10:
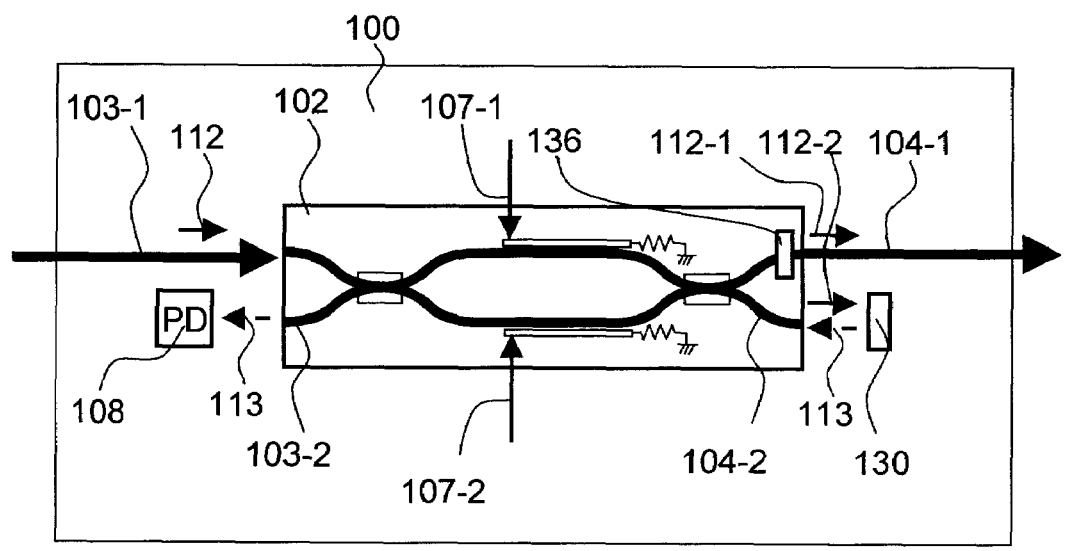
FIG. 10 is a block diagram showing a fourth embodiment of this invention.

FIG. 10 is a block diagram showing a fourth embodiment of this invention. This example is an example where a configuration was tried to be simplified by disposing the photodetector and the reflecting mirror in an unused path among a plurality of input/output paths of the optical modulator 102. In this embodiment, the optical modulator 102 is a Mach-Zehnder type optical modulator formed using waveguides on an LN substrate. This modulator has an unused light input path 103-2 in addition to the light input path 103-1 to which the signal light is inputted, and has an unused light output path 104-2 in addition to the light output path 104-1 from which the signal light is outputted. A polarizer 136 used for adjustment of the output polarization is disposed in the light output path 104-1. In this example, the reflecting mirror 130 is disposed at an exist of the light output path 104-2, and reflects an optical signal, as it is, that is transmitted along the path 112-2, feeding it back as the control light. Moreover, the low-speed photodetector 108 is disposed directly to the light input path 103-2, and measures the average optical power of the control light having passed through the optical modulator 102. By disposing the reflecting mirror and the photodetector in the input/output paths directly in this way, miniaturization, integration, and cost reduction become possible and there is also an advantage that connection with optical fiber becomes unnecessary and therefore a change in the state of polarization becomes not generated.

When the reflecting mirror and the photodetector are disposed in this way in the light input path 104-2 being unused and in the light output path 103-2 being unused, respectively, what is necessary is just to control the bias-voltage Vb applied to the traveling wave electrode input terminal 107-1 or 107-2 so that the average optical power may be minimized. As another variant, it is also possible to dispose either the photodetector or the reflecting mirror in the path 103-1 or path 104-1 of the signal light. In this case, since the transmission characteristics of an optical signal are reversed because of the characteristic of the Mach-Zehnder type optical modulator, it is necessary to apply not the minimization control but the maximization control. Except for this respect, regardless how the low-speed photodetector 108 and the reflecting mirror 130 are arranged in a combination in unused and used optical paths, stabilization control of the bias-voltage can be done without any problem.

Fifth Embodiment

Figure 11:
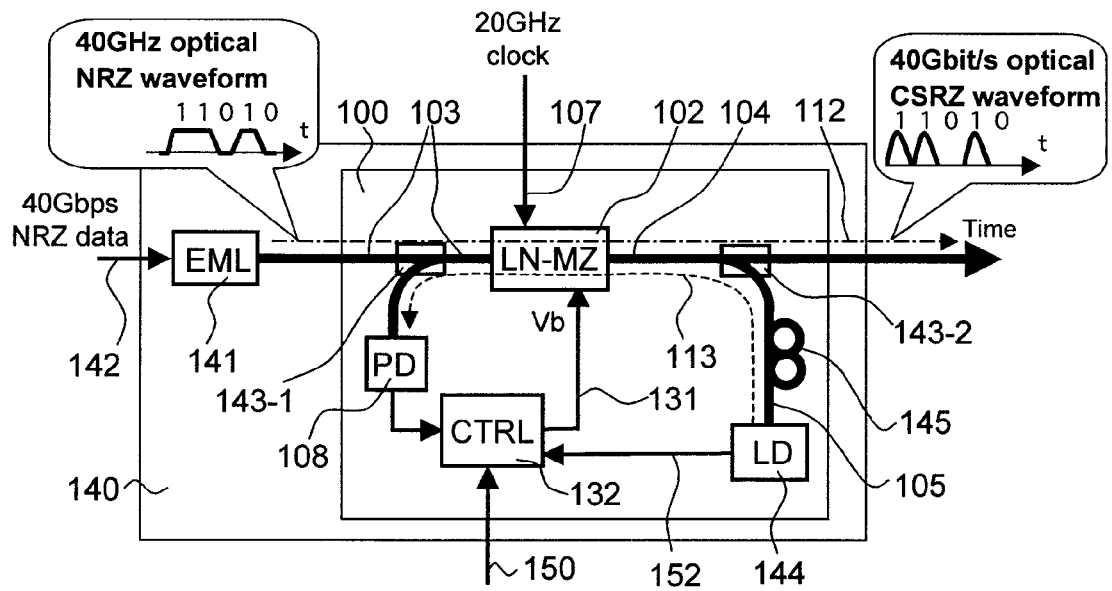
FIG. 11 is a block diagram showing a fifth embodiment of this invention.

FIG. 11 is a block diagram showing a fifth embodiment of this invention, which is an example where a modulator integrated laser optical source 141 is used as a signal optical source to construct an optical transmitter 140 of this invention. A binary 40-Gbps data signal is inputted into an input path 142 for a high-frequency digital electrical signal, and an optical NRZ waveform of 40 Gbps is generated by performing on and off modulation using this on the output light of the modulator integrated laser optical source 141. The optical modulation device 100 of this invention receives the optical NRZ waveform as an input, performs CSRZ modulation on it to convert it to a 40-Gbps optical CSRZ waveform, and outputs it.

The optical transmitter 140 of this embodiment has a control command input terminal 150, and can specify an operation of the control circuit through this control terminal from the outside. For example, when an abnormality or failure of the optical transmitter 140 is detected from the outside, an operation of the minimization control circuit 132 is stopped, moreover, when the optical transmitter 140 is inserted in transmission equipment or the like, the optical transmitter 140 is made to wait for a fixed time until the power of the control light becomes stable and, after that, is allowed to start the control operation, whereby it becomes possible to realize a stable control operation.

Moreover, this example is an example where an exclusive control optical source 144 is provided at the end of the control light input path 105, the outputted control light is transmitted in the optical modulator 102 in an opposite direction along the control light path 113, and subsequently its average optical power is measured by the low-speed photodetector 108. This configuration has advantages that since the control light is transmitted in the optical modulator 102 only in the opposite direction, optical loss is small and the control light is even insusceptible to an influence of a high-frequency modulation by the clock signal.

A wavelength of the control optical source 144 can be freely chosen, as long as it falls in a range where the characteristic of the optical modulator is not influenced. For example, if the wavelength of the modulator integrated laser optical source is 1.55 μm, various wavelengths can be considered in the following cases: in the case where the optical modulator is the absorption type optical modulator with the traveling wave electrodes, the wavelength in the close vicinity of this wavelength (within a few nm); in the case of the LM-MZ modulator capable of an operation in a wide wavelength bandwidth, the wavelength of 1.3 μm; and in the case of a modulator of an even wider wavelength bandwidth, the wavelength of 1.6 μm, 0.98 μm, etc. This optical modulator comes with an effect of preventing interference between the signal light and the control light by choosing the wavelength of the control light such that a difference between the two lights is larger than a spectral line broadening of the signal light even if the two lights exist in the same 1.55 μm band.

In the case where the wavelength of the control light is different from the wavelength of the signal light, a low-loss wavelength separating device (wavelength demultiplexer) may be used to demultiplex and multiplex the signal light and the control light to/from different paths. In this example, the control light is combined to the path of the signal light using a wavelength separating device 143-2, and then the control light is split from the path of the signal light using a wavelength separating device 143-1 and led to the low-speed photodetector 108. The use of such a wavelength separating device can prevent a problem that a part of the signal light reflected by the optical modulator, the output connector, etc and disturbance light inputted from the outside leak into the low-speed photodetector 108 and exerts an adverse effect on the control operation. Such leakage can be prevented by the use of an optical isolator.

In addition, in the case where a laser optical source is used as the control optical source 144 and the control light input path 105 etc. are implemented with optical fiber, although the optical coupling efficiency of the control light is enhanced and an S/N ratio is raised, there is a problem that the control light is not modulated by the optical modulator because of a change in the state of polarization of the optical signal in the optical fiber. In order to circumvent this problem, what is necessary is just to form the optical path from the control optical source to the optical modulator 102 using an optical element that does not cause polarization fluctuation, such as polarization maintaining fiber, optical waveguides, a spatial optics. Alternatively, the optical may be such that a polarization controller 145 is provided in the middle of the control light input path 105 and the control light is adjusted so as to be inputted into the optical modulator 102 with an appropriate state of polarization. After such adjustment is done, the state of polarization may be fixed so that a state of the optical fiber and the adjustment device may be not changed, or an automatic control may be performed so that an optimal input state may be always given.

The optical modulation device 100 of this example is provided with an output terminal of the optical power information of the control optical source, delivers the optical power of the control light measured in the interior of the control optical source to the minimization control circuit 132, which performs on/off switching of the control operation according to the power. That is, when the control light falls to a certain fixed power or lower, the control optical source 144 is assumed to be degraded, the control operation of the minimization control circuit 132 is stopped, and the current bias-voltage Vb is maintained a constant, whereby degradation of the optical signal by overrun of the control circuit can be prevented. Moreover, when starting the optical modulation device, the minimization control circuit 132 is made to start its operation after the output power of the control optical source 144 reaches a constant or higher, whereby it becomes possible to prevent failure of an initial establishing operation etc.

Sixth Embodiment

Figure 12:
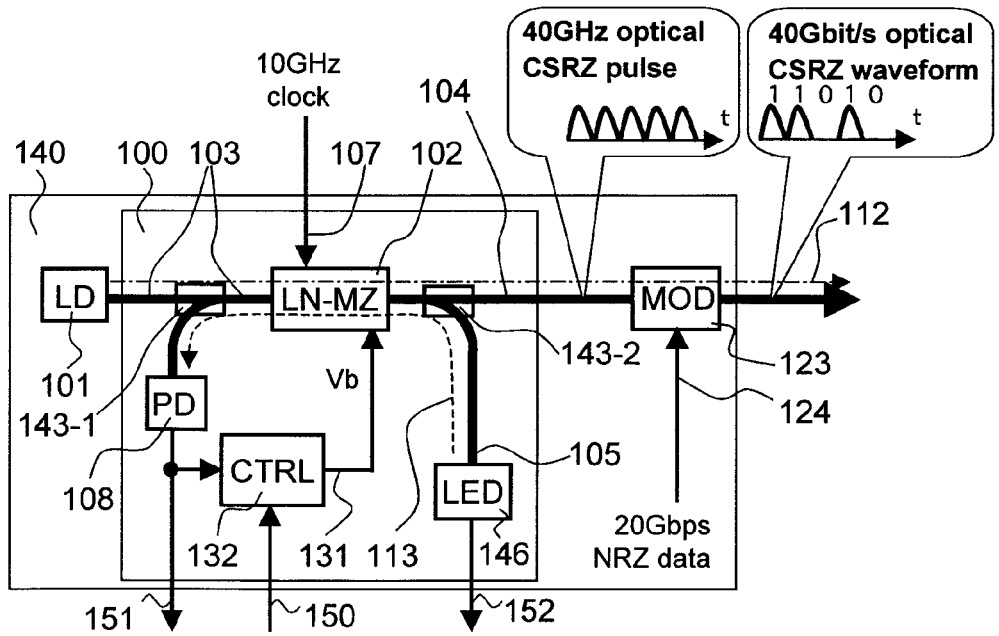
FIG. 12 is a block diagram showing a sixth embodiment of this invention.

FIG. 12 is a block diagram showing a sixth embodiment of this invention, which is an example where an NRZ optical modulator 123 is disposed in the back of the optical modulation device 100 in the optical transmitter 140 of this invention and a broadband optical source 146, such as an LED (Light Emitting Diode), is used as the control optical source. The signal light outputted from the signal optical source 101 is transmitted through the optical modulation device 100 of this invention, converted to a 20-GHz CSRZ optical pulse, subsequently transmitted through the NRZ optical modulator 123 to which a 20-Gbps electric NRZ signal is applied, converted to a 20-Gbps CSRZ light waveform, and outputted. Thus, the position of the optical modulation device of this invention can be exchanged for other optical sources, optical modulators, being able to be disposed in cascade or in parallel freely. As an example of connecting two modulators in parallel, there can be enumerated the optical QPSK (Quadrature Phase-Shift) modulation, the optical SSB (Single Side Band) modulation, etc.

When the broadband optical source 146, such as an LED as in this embodiment, is used as the control optical source, there is given advantages that the frequency band of the optical source is widened, the optical source becomes less prone to arise an adverse effect, such as interfering with the signal light, and it is insusceptible to influences of reflection of optical parts and interference because of low coherency. Thus, as a low-interference control optical source, there are known an SLD (Super Luminescent Diode), an ASE optical source that uses amplified spontaneous emission (ASE) of an optical fiber amplifier, such as an EDFA and a Raman amplifier, a Fabry-Perot type multimode laser, etc. These optical sources can be widely applicable. Moreover, even a DFB laser optical source with high coherency and a Fabry-Perot type multimode laser can be used if their spectral widths are widened to effect decrease in coherency by modulating lasers with a sinusoidal wave or a noise signal intentionally or by letting them oscillate autonomously at specific modes by means of a technique of optical feedback etc.

Note that in the case where wavelength dependency of the optical modulator 102 is large, if the broadband optical source 146 is used, the center wavelength is likely to become different from that of the signal light. Accordingly, there is the possibility that even if the control is performed based on the power of the control light, an optimal signal waveform cannot be necessarily obtained depending on the wavelength of the signal light. In such a case, by disposing an optical filter whose center wavelength coincides with the signal wavelength between the output of the broadband optical source 146 and the optical modulator 102 and equating the center wavelength of the broad band light with that of the signal light, it becomes possible to always maintain an optimal signal waveform. Moreover, a wavelength multiplexer in the interior of wavelength multiplexing optical transmission equipment can be substituted for this optical filter. That is, a single broadband optical source 146 is disposed at the output part of the wavelength multiplexer, the broad band light is inputted into the output port of the wavelength multiplexer in an opposite direction, whereby the broad band light is split to wavelength components, which are outputted from a plurality of input ports of the optical modulator. This optical system can provide a configuration in which the broad band light that is separated into the wavelength components are used for bias point control of the optical modulator connected to input terminals of the wavelength multiplexer. This configuration enables a single broadband optical source 146 to be used commonly for the control of a plurality of optical transmitter.

This configuration also has an advantage that if an unpolarized optical source with no polarization dependency is employed as the control optical source, even if the modulation characteristic of the optical modulator 102 has polarization dependency, its influence is not exerted. That is because, since the unpolarized optical source contains all the polarization components, when the light is transmitted through the polarization-dependent optical modulator 102, at least 50% of components are modulated thereby. In this occasion, if a polarizer is disposed in front of or in back of the optical modulator or in other way so that only polarization component on which the optical modulator has modulation characteristic may be transmitted therethrough, an S/N ratio of the control operation is largely improved because unmodulated components contained in the control light are all removed by the polarizer. This technique is effective especially when there is a polarizer disposed inside the optical modulator 102 beforehand like the polarizer 136 of FIG. 10. As examples of such an unpolarized optical source, there are the above-mentioned an LED, an SLD, and an ASE optical source, etc., any of which is applicable. Moreover, a technique of disposing a depolarizing element (depolarizer) in the path of the control light and a technique of removing polarization dependency by scrambling temporally the state of polarization of the control light in a high speed like the above-mentioned example are also applicable.

The optical transmitter 140 is equipped with the control command input terminal 150, an output terminal 151 of optical power information, and an output terminal 152 of optical power information of the control optical source. It is capable of transferring an internal state of the optical modulation device to the outside and allows an operation of the control circuit from the outside to be assigned. Failure and degradation of the control optical source can be determined from the optical power information of the control optical source obtainable from the output terminal 152. Moreover, failure and degradation of the low-speed photodetector 108 and the optical modulator 102, or a state of completion of establishing the automatic control can be determined from the optical power information obtainable from the output terminal 151. Especially when the state of the minimization control circuit 132 is set up using these information, namely when the low-speed photodetector 108 or the broadband optical source 146 is failed, by stopping an operation of the minimization control circuit and fixing the bias-voltage to a current voltage, it becomes possible to prevent a situation in which the bias-voltage is shifted largely by erroneous automatic control, an operation of the optical transmitter is stopped, and information cannot be transmitted, and the like. Moreover, when the optical transmitter 140 is inserted in the transmission equipment and in a like situation, the control operation is made to wait for a fixed time until the power of the control light becomes stable, and after that the control operation is started, whereby it becomes possible to realize a stable control operation.

Seventh Embodiment

Figure 13:
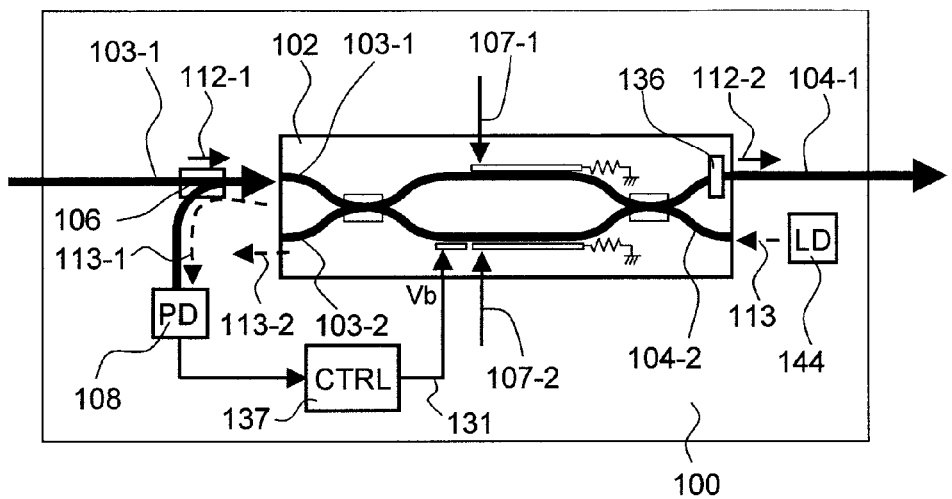
FIG. 13 is a block diagram showing a seventh embodiment of this invention.

FIG. 13 is a block diagram showing a seventh embodiment of this invention, which is a configuration example of a CSRZ optical modulation device 100 of this invention in which the control optical source 144 is disposed in the light output path 104-2 of the optical modulation device of this invention. The control light outputted after passing through the optical modulator 102 is split by the optical coupler 106 disposed in the middle of the light input path 103-1 and led to the low-speed photodetector 108. In the case of this example, since only the control optical source is disposed in the unused optical input/output path, by controlling the bias-voltage Vb using the maximization control circuit 137 so that the average optical power measured by the low-speed photodetector 108 may be maximized and applying it to the input terminal 131 of the bias control signal, it becomes possible to maintain the bias-voltage of the CSRZ modulation always at the optimal point.

The disposition of the control optical source and the photodetector as shown in this example may be replaced with a suitable combination of disposition of them through an optical coupler, a wavelength separating device, etc. in the path of the signal light, disposition of them in an unused input/output path of the optical modulator 102, etc. Especially when disposing the low-speed photodetector 108 and the control optical source 144 in unused optical paths, a small optical modulation device can be realized by manufacturing them so as to be integrated with the optical modulator or disposing them so as to be built in the same package.

Eighth Embodiment

Figure 14:
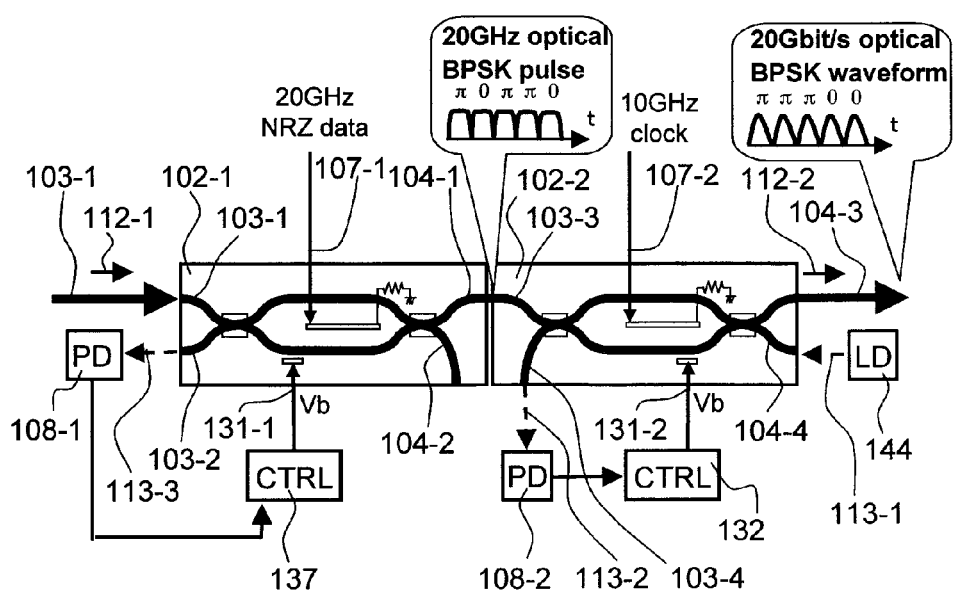
FIG. 14 is a block diagram showing an eighth embodiment of this invention.

FIG. 14 is a block diagram showing an eighth embodiment of this invention, which is an example where two optical modulators 102-1, 102-2 are disposed being integrated with each other in the interior of the optical modulation device of this invention and the single control optical source 144 is commonly used to control bias-voltages of the two optical modulators.

In this example, the signal light inputted from the light input path 103-1 is subjected to binary phase modulation (BPSK) with the NRZ data signal of 20 Gbit/s when passing through the optical modulator 102-1, outputted to the light output path 104-1, subsequently inputted into an input path 103-3 of the optical modulator 102-2, subjected to superimposition of CSRZ pulse modulation of 20 GHz by a 10-GHz clock signal when passing through the optical modulator 102-2 to be converted into a 20-Gbps optical CSRZ-BPSK waveform, and outputted to the outside from a light output path 104-3. The control light outputted from the control optical source 144 is inputted into an unused light output path 104-4 of the optical modulator 102-2 on the downstream side, transmitted through the optical modulator 102-2 in an opposite direction, and outputted to two light input paths 103-3, 103-4. A low-speed photodetector 108-2 is disposed in the unused light input path 103-4, and the minimization control circuit 132 automatically controls the bias-voltage Vb applied to the optical modulator 102-2 so that the average optical power of the control light measured by the low-speed photodetector 108-2 may be minimized. Such control has an effect that always maintains the optical modulator 102-2 at an optimal bias and maintains the power of the control light inputted into the upstream optical modulator 102-1 from the light output path 104-1. This is because a sum of the powers of the outputted optical signals has a property of being constant in the MZ modulator. As a result, the control light of sufficient power is always inputted into the upstream optical modulator 102-1.

The control light that is transmitted through the optical modulator 102-1 in an opposite direction is detected by a low-speed photodetector 108-1 disposed in an unused light input path 103-2. The maximization control circuit 137 automatically controls the bias-voltage Vb applied to the optical modulator 102-1 using the average optical power information of the control light obtained from the low-speed photodetector 108-1 so that this average optical power may be maximized. Although this example showed an example of using the minimization control circuit 132 and the maximization control circuit 137 that were independent in order to control the two modulators, the control may be realized with a common control circuit having a plurality of input/output control functions. Moreover, regarding the low-speed photodetector, the following multidimensional optimization control with two input parameters and one output parameter may be performed: using only the average optical power information obtained from the low-speed photodetector 108-1 without disposing the low-speed photodetector 108-2, the bias-voltage applied to the optical modulator 102-2 is controlled so that the average optical power may be maximized or the bias-voltage applied to the optical modulator 102-1 is controlled so that the average optical power may be minimized.

It is not necessarily required to apply this invention to the control of the two optical modulators. For example, the following scheme may be adopted: the power of the signal light outputted from the unused light output path 104-2 of the optical modulator 102-1 is measured by a photodetector, and the bias-voltage Vb applied to a bias control signal input terminal 131-1 of the optical modulator 102-1 is subjected to automatic control such that the measured value may be minimized or maximized, or may be a constant.

There is no problem in replacing the two optical modulators 102-1, 102-2 shown in this example with two optical modulators simply connected together by optical fiber etc. or in actually building them by monolithically integrating two modulators on a single substrate.

Modulation schemes to which this invention is applicable are not limited only to the CSRZ modulation as used for the optical modulator 102-1 of this example. Generally, modulations of placing an optimal bias-voltage at a maximum extinction point of a MZ modulator, such as the BPSK modulation and the duobinary modulation that are the optical binary phase modulation, has the same problem of controlling the bias-voltage as in the case of the CSRZ modulation described in the conventional example, and accordingly application of this invention to the modulation is especially effective. Moreover, in the case of absence of the signal light, this invention is capable of bias-voltage control and has effects of a short rise time of the modulation device, insusceptibility to outer disturbance, insusceptibility to a change in the waveform of a high-frequency signal, imperviousness to a modulation scheme. Therefore, this invention attains a sufficient effect when being applied to common optical modulations, such as normal NRZ modulation and analog modulation. That is, this invention can be applied to any device of whatever modulation scheme in principle as long as the optical modulator has traveling wave electrodes and uses a modulation scheme capable of bias control that uses the power of the control light passing through the optical modulator. As such an example, there is a case where NRZ modulation, multivalued modulation, or the like is performed using an LN-MZ optical modulator or an absorption-type optical modulator with traveling wave electrodes. This invention can be applied to a wide range of cases.

Ninth Embodiment

Figure 15:
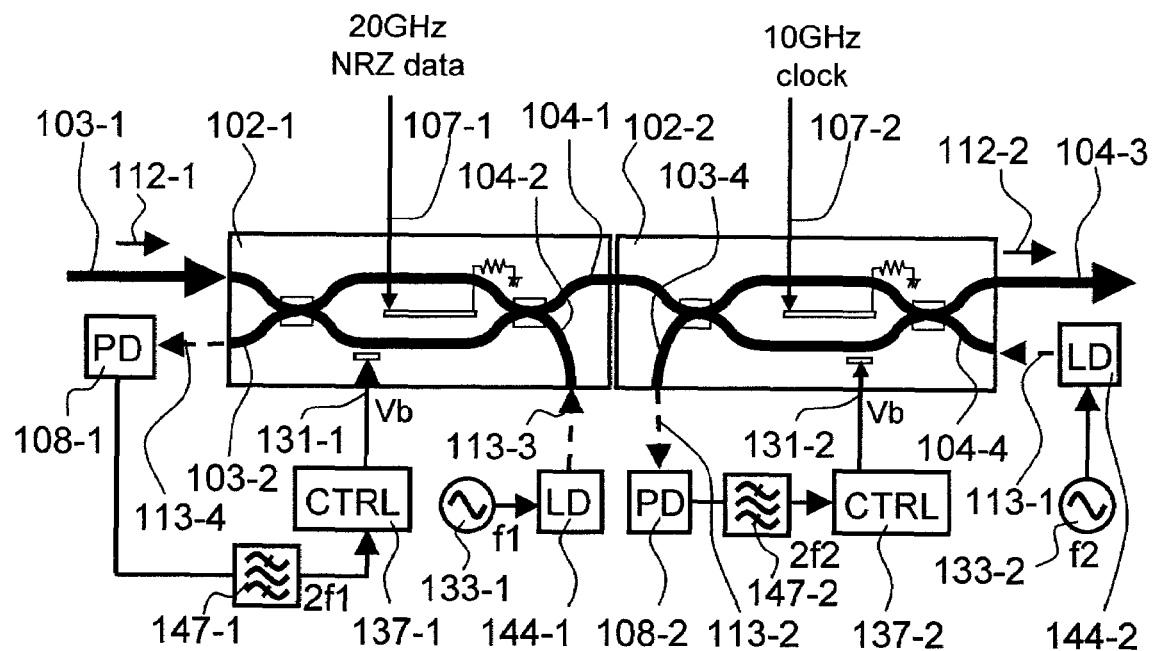
FIG. 15 is a block diagram showing a ninth embodiment of this invention.

FIG. 15 is a block diagram showing a ninth embodiment of this invention, which is an example where control optical sources 144-1, 144-2 are arranged for two optical modulators 102-1, 102-2, respectively, and bias-voltage control is performed on the two independently. That is, the control optical source 144-1 is disposed in the unused light output path 104-2 of the optical modulator 102-1 in the preceding stage, the control light is inputted in an opposite direction, and the control light outputted from the unused light input path 103-2 is detected by the low-speed photodetector 108-1. Moreover, the control optical source 144-2 is disposed in the unused light output path 104-4 of the optical modulator 102-2 in the subsequent stage, the control light is inputted in an opposite direction, and the control light outputted from the unused light input path 103-4 is detected by the low-speed photodetector 108-2. In this configuration, there is the possibility that the control light of the control optical source 144-2 is leaked into the low-speed photodetector 108-1 and exerts an adverse effect on a control operation. In order to prevent this, in this example, the control optical sources 144-1, 144-2 are modulated by electrical signals of mutually different frequencies f1, f2 outputted from respective low-frequency sinusoidal wave signal sources 133-1, 133-2, and these frequency components are used to discriminate the two control light. Namely, for example, only a component of frequency 2f1 is extracted from among electrical signals outputted from the low-speed photodetector 108-1 with a bandpass filter 147-1 (transmission center frequency 2f1), and the bias-voltage Vb is controlled by a maximization control circuit 137-1 so that this component may be maximized, whereby maximization control of the bias-voltage can be realized without any problem even with leakage of the control light from other modulator.

Furthermore, as a further different configuration, the following configuration may be adopted: an optical power signal obtained from the low-speed photodetector 108-1 is split into two, not using the low-speed photodetector 108-1, the two are extracted with bandpass filters whose transmission center frequencies corresponding to 2f1 and 2f2, respectively, bias-voltages of the optical modulator 102-1 and the optical modulator 102-2 are automatically controlled so that the respective components may be maximized independently.

In order to exclude the influence of other control light as in this case, an approach of setting wavelengths of the control optical sources so as to have mutually different wavelengths and extracting only necessary wavelength using an optical filter disposed in front of the photodetector may be used. Moreover, if control such that the average power of the control light outputted to the unused light input path 103-4 is performed in the downstream optical modulator 102-2, the power of the control light inputted to the previous-stage optical modulator 102-1 through the light output path 104-1 can be controlled to almost zero, and leakage of the control light to the low-speed photodetector 108-1 can be avoided. For example, in the case where the optical modulator 102-2 in the subsequent stage is operated by a bias-voltage at which the transmittance is minimized as in the CSRZ modulation and the duobinary modulation, this can be realized by inputting the control light from the light output path 104-3.

Tenth Embodiment

Figure 16:
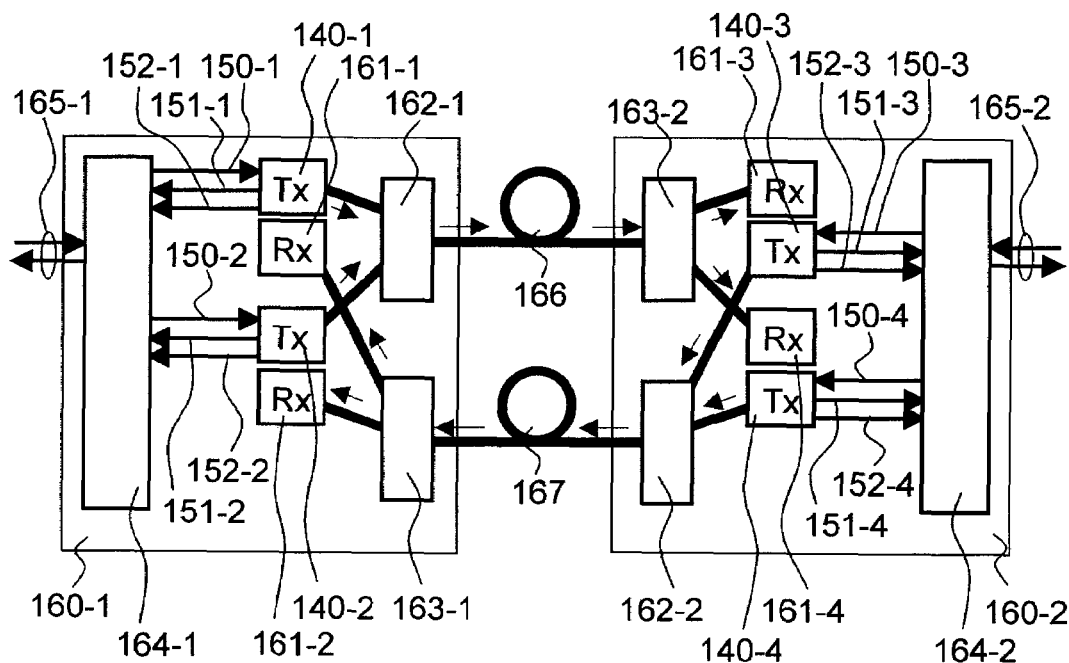
FIG. 16 is a block diagram showing a tenth embodiment of this invention.

FIG. 16 is a block diagram showing a tenth embodiment of this invention, illustrating configurations of optical transmission equipment 160-1 and 160-2 and a configuration of an optical transmission system using this. Optical transmitters 140-1, 140-2 of this invention and optical receivers 161-1, 161-2 masking pairs with the respective optical transmitters are disposed in the one optical transmission equipment 160-1. The optical signal of different wavelengths outputted from the respective optical transmitters are multiplexed by a wavelength multiplexer 162-1 to a wavelength-multiplexed signal, which is transmitted through a westward optical fiber transmission path 166 and received by the other optical transmission equipment 160-2 disposed a few km to a few thousand km away. In the interior of the optical transmission equipment 160-2, the received wavelength multiplexed signal is demultiplexed to the different wavelengths by a wavelength demultiplexer 163-1 and received by respective optical receivers 161-3, 161-4. Optical transmitters 140-3, 140-4 of this invention are arranged adjacent to these optical receivers that make pairs. Optical signals of them are wavelength-multiplexed by a wavelength multiplexer 162-2, transmitted through an eastward optical fiber transmission path 167, and received by the optical transmission equipment 160-1. A transmission equipment control circuit 164-1 is disposed in the optical transmission equipment 160-1, and is connected with the optical transmitters 140-1, 140-2 through control command input terminals 150-1, 150-2, output terminal 151-1, 151-2 of optical power information, output terminals 152-1, 152-2 of optical power information of the control optical source, respectively. The transmission equipment control circuit 164-1 can receive instructions from the outside and transmit information to the outside through a control information path 165-1. This configuration enables the transmission equipment control circuit 164 to grasp and determine a failure state and an implementation state of each transmitter, receive an instruction from the outside, send a proper control command to each transmitter, and manage its state.

Figure 17:
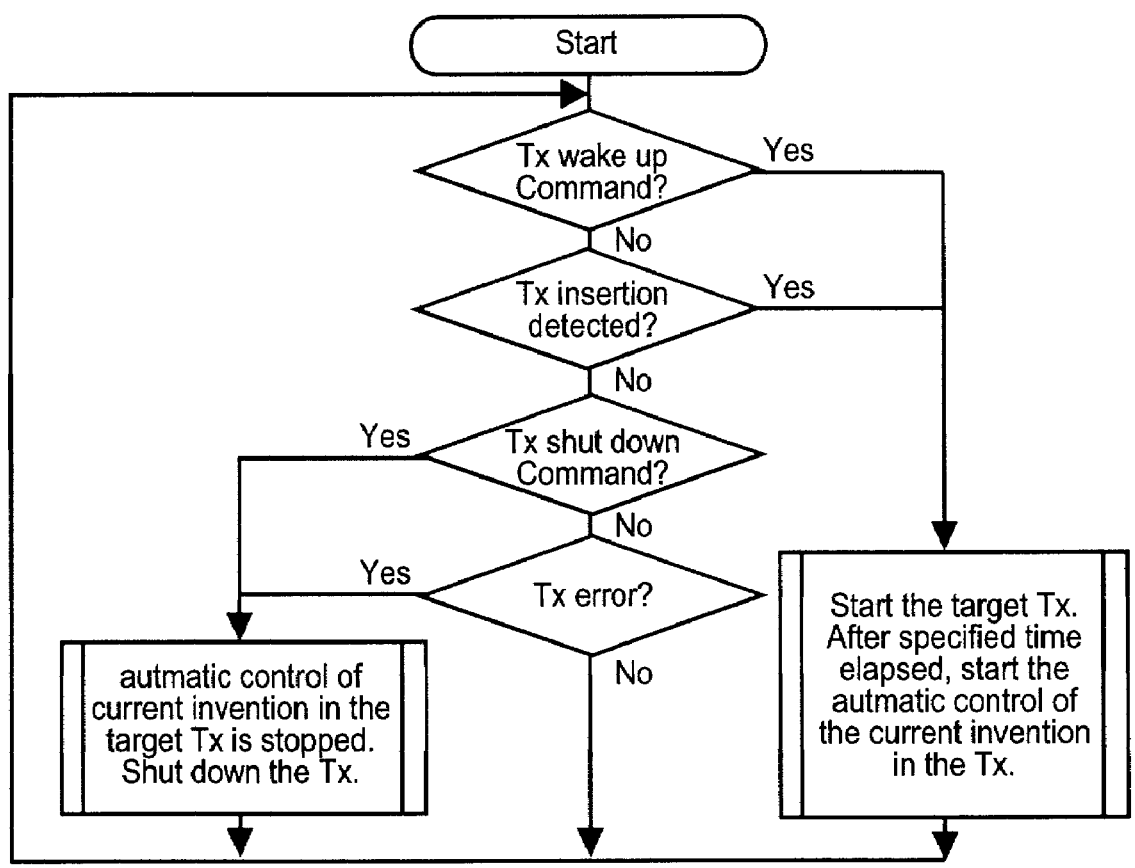
FIG. 17 is a flowchart of an operation of a transmission equipment control circuit 164 in the tenth embodiment of this invention.

FIG. 17 is a flowchart of an operation of the transmission equipment control circuit 164 in the tenth embodiment of this invention. Each control circuit determines whether a wakeup command of a specific optical transmitter 140 is inputted from a control information path 165 or whether a new optical transmitter 140 is implemented in the transmission equipment. If such a state occurs, a transmitter to be targeted is waked up and the optical modulator control circuit of this invention is waked up after lapse of a fixed time. Moreover, when a shutdown command of a specific optical transmitter 140 is inputted, or when abnormality of a specific optical transmitter is detected from the information of the output terminals 151, 152, an optical modulation of the optical transmitter to be targeted is halted, and subsequently interception of the optical transmitter is performed. By this, even in the case where the optical transmitter is increased in number or when it fails or it receives a command of wakeup or shutdown, it becomes possible to apply this invention thereto without any problem.

Eleventh Embodiment

Figure 18:
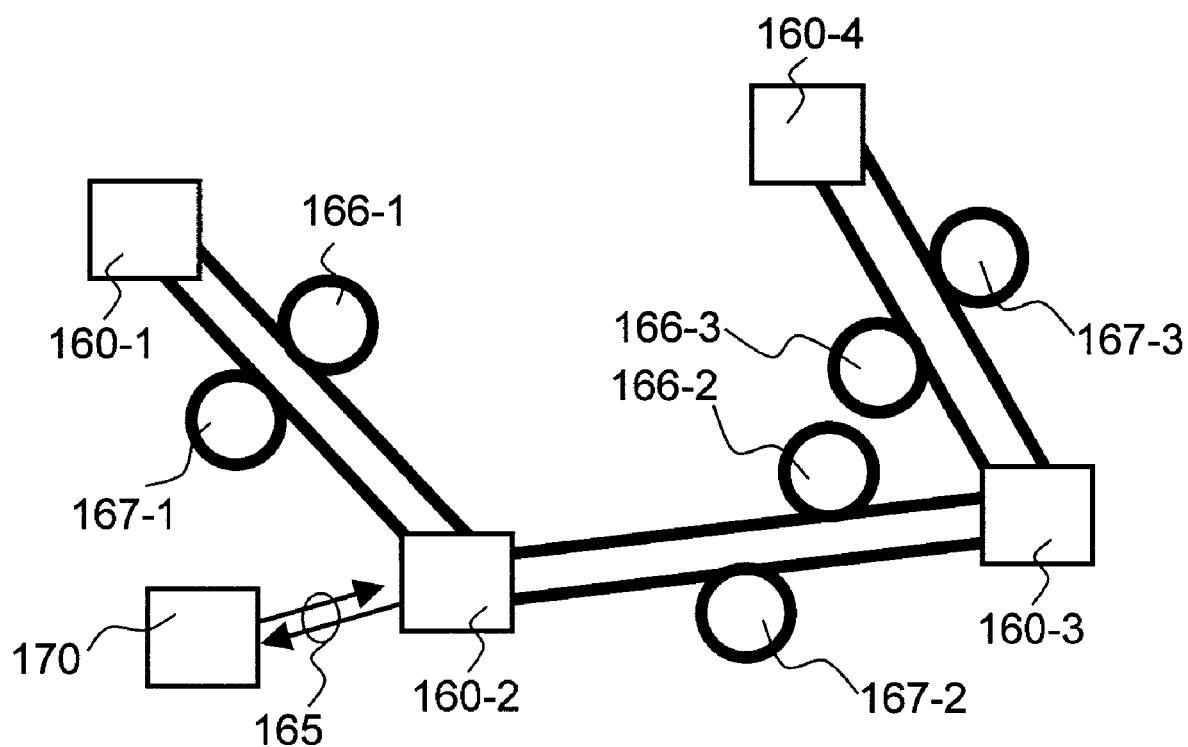
FIG. 18 is a block diagram showing an eleventh embodiment of this invention.

FIG. 18 is a block diagram showing an eleventh embodiment of this invention, illustrating optical transmission equipment 160-1, 160-2, 160-3, and 160-4 and a configuration of an optical network. Each optical transmission equipment is connected mutually with other optical transmission equipment 160 with transmission paths consisting of a pair of optical fiber transmission paths (westward optical fiber transmission path 166 and eastward optical transmission path 167). The optical transmission equipment 160-2 among these pieces of optical transmission equipment is provided with a control console 170, which enables the operator to stop a control and monitor a failure state to the optical transmitters of this invention disposed in the respective pieces of the optical transmission equipment through a control information path 165. It becomes possible to transfer a signal of the control information path 165 using control information transferring means that connects the optical transmission equipment and perform remote control by transferring the control information to the optical transmission equipment 160-1, 160-3, and 160-4 disposed remotely through the transmission path. As such control information transferring means, the techniques used in the conventional optical fiber transmission equipment are arbitrarily applicable. For example, there are a technique of transferring control information by writing it in a SONET/SDH overhead part of a main signal transmitted in a transmission path, a technique of transferring it using monitor light of a different wavelength being simultaneously transmitted after being multiplexed with a wavelength multiplexed signal, a technique of transferring it via a different network, etc.

What is claimed is:

1. An optical modulation device, comprising:
   an optical modulator equipped with traveling-wave type modulating electrodes to which an analog or digital electrical signal of a high frequency is applied;
   an input path of light to be modulated connected to an input port of the optical modulator;
   an output path of the modulated light connected with any of output ports of the optical modulator; and
   a photodetector for detecting optical power of control light that is transmitted through the interior of the optical modulator in a direction opposite to the modulated light and outputted from an input port.

2. The optical modulation device according to claim 1, wherein the optical modulator is any one of the Mach-Zehnder type optical modulator, the traveling-wave type semiconductor absorptive optical modulator, the traveling-wave type optical phase modulator, the traveling-wave type optical power modulator, and the traveling-wave type optical power/phase modulator.

3. The optical modulation device according to claim 1,
wherein input light of the optical modulation device is given any one of the carrier-suppressed RZ (CSRZ) modulation, the optical pulse modulation, the binary optical phase modulation, and the optical duobinary modulation, and is outputted.

4. The optical modulation device according to claim 1, comprising:
a reflecting mirror that is connected to an output port of the optical modulator, reflects back a part of light modulated by the optical modulator, and makes it incident on the output port of the optical modulator again.

5. The optical modulation device according to claim 4,
wherein a depolarizing element is disposed between the optical modulator and the reflecting mirror, or a path between an output port of the optical modulator and the reflecting mirror are connected through polarization maintaining means or polarization adjusting means.

6. The optical modulation device according to claim 1, comprising:
a control optical source that is connected to an output port of the optical modulator and outputs the control light with low-interference to light to be modulated,
wherein the control light is guided to the photodetector after it is inputted from an output port of the optical modulator and outputted from an input port of the optical modulator.

7. The optical modulation device according to claim 6,
wherein the control optical source is an unpolarized optical source, or a depolarizing element is provided at an output port of the control optical source, or the control optical source is connected with an output port of the optical modulator through polarization maintaining means or polarization adjusting means.

8. The optical modulation device according to claim 1, comprising:
an automatic control circuit that receives optical power information outputted from the photodetector as its input,
wherein a bias control signal outputted from the automatic control circuit is fed to a bias electrode of the optical modulator.

9. The optical modulation device according to claim 1,
wherein the automatic control circuit is either of the following two circuits:
a maximization control circuit or minimization control circuit for changing the bias control signal so that an input signal inputted from the photodetector may be maximized or minimized; and
an automatic control circuit that, after performing dithering of frequency f on the bias control signal, controls the input signal inputted into the automatic control circuit so that a component of frequency f or component of frequency 2f in the input signal f may become zero or be minimized/maximized, or so that a phase of the component of frequency f or the component of frequency 2f in the input signal may become a constant.

10. The optical modulation device according to claim 1,
wherein observing the strength of an output signal of the photodetector, or the power of the control light inputted into the optical modulator, or the power of the control light outputted from an input port of the optical modulator, when at least one of these strength and powers becomes a constant or less, the control operation is stopped, and when it becomes a constant or more, immediately after this time or after lapse of a fixed time, the control operation is started.

11. An optical modulation device in which a plurality of optical modulation devices each according to claim 1 are connected in parallel or in cascade, comprising:
a reflecting mirror for reflecting back a part of the modulated light outputted from an output port of the optical modulator located most downstream of the optical modulation device and inputting it to an output port of the optical modulator as the control light, or a control optical source that is connected to an output port of the optical modulator located most downstream thereof and outputs the control light,
wherein beams of the control light are detected by the photodetectors disposed beside the respective optical modulation devices.

12. An optical transmitter,
wherein a signal optical source outputting modulated or nonmodulated laser light from it and the optical modulation device according to claim 1 are connected in cascade, or
the signal optical source outputting modulated or nonmodulated laser light from it and a plurality of optical modulation devices including at least one optical modulation device according to claim 1 are connected in cascade or in parallel.

13. The optical transmitter according to claim 12, comprising:
an information path that enables optical power information outputted from the photodetector or optical power information of the control light inputted into the optical modulator to be measured and outputted to the outside, or
an information path into which start or stop of an operation of the control circuit is inputted.

14. Optical transmission equipment comprising:
at least one optical transmitter according to claim 12 and an optical receiver for receiving output light of the optical transmitter,
wherein a control operation of an automatic control circuit is started immediately after insertion of the optical transmitter(s) or after lapse of a fixed time, or commands of start and stop of the control operation of the optical modulator in the optical transmitter(s) are received from the outside.

15. An optical modulation device, comprising:
at least one piece of optical transmission equipment according to claim 14 and at least one control console,
a control operation of the automatic control circuit being able to be remote-controlled by a command from the control console; or
an information path that enables the following information to be measured and outputted therefrom: the optical power information outputted from the photodetectors of the optical transmitters being disposed for the respective optical transmission equipment, or the optical power information of the control light inputted into the optical modulator.

* * * * *